United States Patent
Choi

(10) Patent No.: US 12,003,876 B2
(45) Date of Patent: Jun. 4, 2024

(54) IMAGE SENSOR INCLUDING TWO BOOSTING DRIVERS

(71) Applicant: Samsung Electronics Co., Ltd., Suwon-si (KR)

(72) Inventor: Yong Suk Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/329,353

(22) Filed: Jun. 5, 2023

(65) Prior Publication Data

US 2023/0308783 A1     Sep. 28, 2023

Related U.S. Application Data

(63) Continuation of application No. 17/500,468, filed on Oct. 13, 2021, now Pat. No. 11,711,632.

(30) Foreign Application Priority Data

Feb. 4, 2021 (KR) .................. 10-2021-0015798

(51) Int. Cl.
*H04N 25/75* (2023.01)
*H04N 25/709* (2023.01)
*H04N 25/772* (2023.01)

(52) U.S. Cl.
CPC ........... *H04N 25/75* (2023.01); *H04N 25/709* (2023.01); *H04N 25/772* (2023.01)

(58) Field of Classification Search
CPC .. H04N 5/378; H04N 5/3698; H04N 5/37455; H04N 25/75; H04N 25/709; H04N 25/772
See application file for complete search history.

(56) References Cited

U.S. PATENT DOCUMENTS

| | | |
|---|---|---|
| 7,405,720 B2 | 7/2008 | Nakajima et al. |
| 8,174,603 B2 | 5/2012 | Krymski |
| 9,560,275 B2 | 1/2017 | Watanabe |
| 9,954,026 B2 | 4/2018 | Sakuragi |
| 10,748,952 B2 | 8/2020 | Yasu et al. |

(Continued)

FOREIGN PATENT DOCUMENTS

| | | |
|---|---|---|
| KR | 101118075 B1 | 3/2012 |
| KR | 102135677 B1 | 7/2020 |

*Primary Examiner* — Nicholas G Giles
(74) *Attorney, Agent, or Firm* — Harness, Dickey & Pierce, P.L.C.

(57) ABSTRACT

An image sensor comprises a row driver, a first row line which is connected to the row driver, first to fourth pixels connected to the first row line, first to fourth column lines connected to the first to fourth pixels and configured to receive respective first to fourth output signals from the first to fourth pixels, a boosting circuit connected to the first to fourth column lines, a second row line connected to the boosting circuit, first and second boosting drivers connected, respectively, to first and second terminals of the second row line. The boosting circuit may adjust voltage of the first and second output signals based on a first boosting enable signal received from the first boosting driver and may adjust a voltage of the third and fourth output signals based on a second boosting enable signal received from the second boosting driver.

16 Claims, 16 Drawing Sheets

(56) References Cited

U.S. PATENT DOCUMENTS

| | | | |
|---|---|---|---|
| 2007/0076109 A1* | 4/2007 | Krymski | H04N 5/32 348/300 |
| 2018/0005582 A1 | 1/2018 | Takahara | |
| 2020/0396406 A1* | 12/2020 | Freson | H04N 25/76 |

* cited by examiner

ID_SENSOR INCLUDING TWO BOOSTING DRIVERS

CROSS-REFERENCE TO RELATED APPLICATIONS

This application is a continuation of U.S. patent application Ser. No. 17/500,468, filed on Oct. 13, 2021, which claims priority, under 35 U.S.C. § 119, from Korean Patent Application No. 10-2021-0015798 filed on Feb. 4, 2021 in the Korean Intellectual Property Office, the disclosure of each of which is incorporated herein by reference in its entirety.

BACKGROUND

1. Field

The present inventive concepts relate to an image sensor.

2. Description of the Related Art

An image sensing device is one of semiconductor elements that convert optical information into an electrical signal. Such an image sensing device may include a charge coupled device (CCD) image sensing device and a complementary metal-oxide semiconductor (CMOS) image sensing device.

The CMOS image sensor may be abbreviated as a CIS (CMOS image sensor). The CIS may have a plurality of pixels arranged in two dimensions. Each of the pixels may include, for example, a photo diode (PD). The photo diode may serve to convert incident light into electrical signals.

Recently, with development of the computer industry and the telecommunications industry, demands for image sensors having improved performance have increased in various fields such as a digital camera, a video camera, a smart phone, a game console, a security camera, a medical micro camera, and a robot.

SUMMARY

Aspects of the present inventive concepts provide an image sensor in which a settling time is reduced.

Aspects of the present inventive concepts also provide an image sensor in which dark shading or dark offset is reduced and image quality is improved.

However, aspects of the present inventive concepts are not restricted to the ones set forth herein. These and other aspects of the present inventive concepts will become more apparent to one of ordinary skill in the art to which the present inventive concepts pertains by referencing the detailed description of the present inventive concepts given below.

According to some example embodiments of the present inventive concepts, the image sensor comprises a first row driver, a first row line which is connected to the first row driver and extends in a first direction, a first pixel, a second pixel, a third pixel and a fourth pixel which are connected to the first row line and sequentially arranged in the first direction, a first column line which is connected to the first pixel and is configured to receive a first output signal from the first pixel, a second column line which is connected to the second pixel and is configured to receive a second output signal from the second pixel, a third column line which is connected to the third pixel and is configured to receive a third output signal from the third pixel, a fourth column line which is connected to the fourth pixel and is configured to receive a fourth output signal from the fourth pixel, a boosting circuit connected to the first to fourth column lines, a second row line which is connected to the boosting circuit and extends in the first direction, a first boosting driver connected to a first terminal of the second row line in a direction opposite to the first direction, and a second boosting driver connected to a second terminal of the second row line in the first direction, wherein the boosting circuit is configured to adjust voltages of the first and second output signals based on a first boosting enable signal received from the first boosting driver, and adjust voltages of the third and fourth output signals based on a second boosting enable signal received from the second boosting driver.

According to some example embodiments of the present inventive concepts, the image sensor comprises a row driver, a row line connected to the row driver, a first pixel, a second pixel and a third pixel connected to the row line, a first column line which is connected to the first pixel and is configured to receive a first output signal from the first pixel, a second column line which is connected to the second pixel and is configured to receive a second output signal from the second pixel, a third column line which is connected to the third pixel and is configured to receive a third output signal from the third pixel, a first boosting circuit which is connected to the first column line and is configured to adjust a voltage of the first output signal, a second boosting circuit which is connected to the second column line and is configured to adjust a voltage of the second output signal, and a third boosting circuit which is connected to the third column line and is configured to adjust a voltage of the third output signal, wherein the third pixel is between the first and second pixels, the third column line is between the first and second column lines, and the first and second boosting circuits are configured to operate earlier than the third boosting circuit.

According to some example embodiments of the present inventive concepts, the image sensor comprises a row driver, a first row line which is connected to the row driver, and extends in a first direction, a first pixel and a second pixel which are connected to the first row line and sequentially arranged in the first direction, a first column line which is connected to the first pixel and is configured to receive a first output signal from the first pixel, a second column line which is connected to the second pixel and is configured to receive a second output signal from the second pixel, a first boosting circuit connected to the first column line, a second boosting circuit connected to the second column line, a second row line connected to the first and second boosting circuits, and a first boosting driver and a second boosting driver connected to opposite ends of the second row line, wherein the second boosting circuit is configured to adjust a voltage of the second output signal based on a first boosting enable signal received from the first boosting driver based on the image sensor operating in a first operating mode, and the second boosting circuit is configured to adjust a voltage of the second output signal based on a second boosting enable signal received from the second boosting driver based on the image sensor operating in a second operating mode that is different from the first operating mode.

Other features and example embodiments may be apparent from the following detailed description, the drawings, and the claims.

BRIEF DESCRIPTION OF THE DRAWINGS

The above and other example embodiments and features of the present inventive concepts will become more apparent by describing in detail some example embodiments thereof with reference to the attached drawings, in which.

DETAILED DESCRIPTION

Hereinafter, some example embodiments according to the technical idea of the present inventive concepts will be explained referring to the accompanying drawings.

Figure 1:
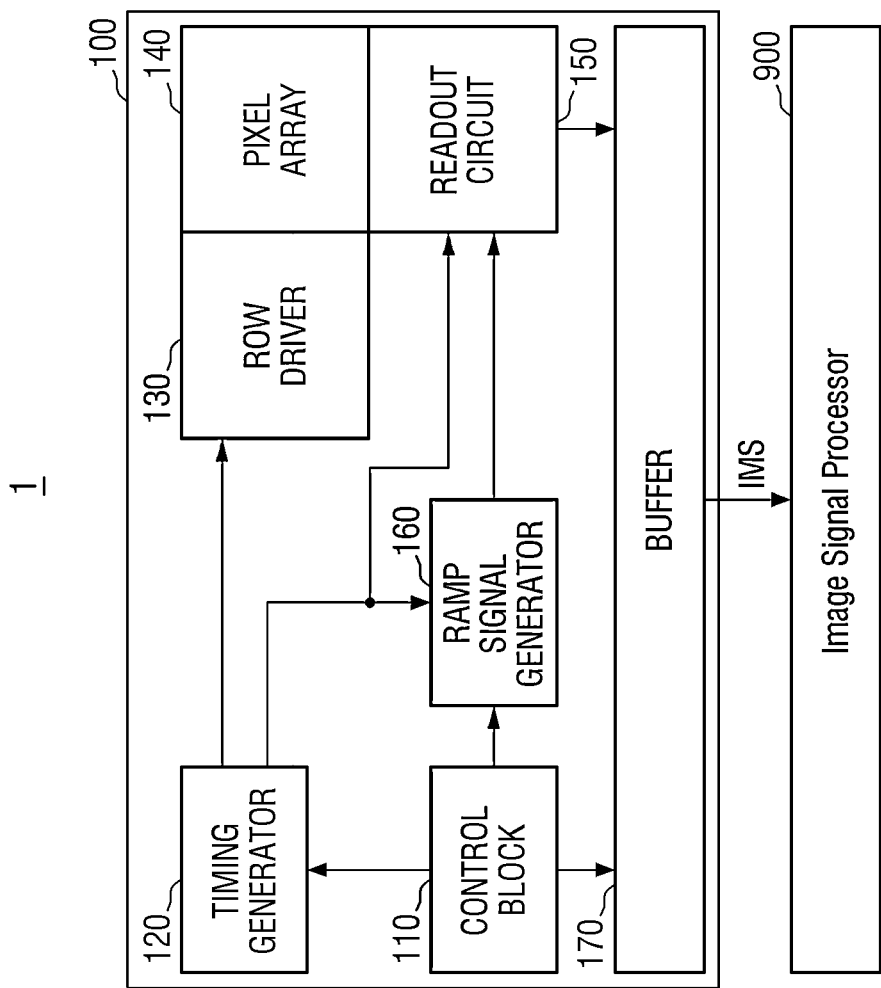
FIG. 1 is a block diagram of an image sensing device according to some example embodiments.

FIG. 1 is a block diagram of an image sensing device according to some example embodiments.

Referring to FIG. 1, the image sensing device 1 may include an image sensor 100 and an image signal processor 900.

The image sensor 100 may generate an image signal IMS by sensing an image to be sensed using light. In some example embodiments, although the generated image signal IMS may be, for example, a digital signal, some example embodiments according to the technical ideas of the present inventive concepts are not limited thereto.

The image signal IMS may be provided to the image signal processor 900 and processed. The image signal processor 900 receives the image signal IMS that is output from a buffer 170 of the image sensor 100, and may process or treat the received image signal IMS to be easily displayed.

In some example embodiments, the image signal processor 900 may perform digital binning on the image signal IMS that is output from the image sensor 100. At this time, the image signal IMS that is output from the image sensor 100 may be a raw image signal from the pixel array 140 without analog binning, and may also be an image signal IMS on which analog binning has already been performed.

In some example embodiments, the image sensor 100 and the image signal processor 900 may be placed separately from each other as shown. For example, the image sensor 100 may be mounted on the first chip, the image signal processor 900 may be mounted on the second chip, and they may communicate with each other through a predetermined interface. However, some example embodiments are not limited thereto, and the image sensor 100 and the image signal processor 900 may be implemented as a single package, for example, an MCP (multi-chip package).

The image sensor 100 may include a control register block 110, a timing generator 120, a row driver 130, a pixel array 140, a readout circuit 150, a ramp signal generator 160, and a buffer 170. The row driver 130 may be referred to herein interchangeably as a first row driver.

The control register block 110 may generally control the operation of the image sensor 100. In particular, the control register block 110 may transmit an operating signal directly to the timing generator 120, the ramp signal generator 160, and the buffer 170.

The timing generator 120 may generate a signal that serves as a reference for the operation timing of various components of the image sensor 100. The operation timing reference signal generated by the timing generator 120 may be transferred to the row driver 130, the readout circuit 150, the ramp signal generator 160, and the like.

The ramp signal generator 160 may generate and transmit the ramp signal used in the readout circuit 150. For example, the readout circuit 150 may include a correlated double sampler (CDS), a comparator, and the like. The ramp signal generator 160 may generate and transmit the ramp signal used in the correlated double sampler, the comparator, and the like.

The buffer 170 may include, for example, a latch. The buffer 170 may temporarily store the image signal IMS to be provided to the outside, and may transmit the image signal IMS to an external memory or an external device.

The pixel array 140 may sense external images. The pixel array 140 may include a plurality of pixels (or unit pixels). The row driver 130 may selectively activate the row of the pixel array 140.

The readout circuit 150 may sample the pixel signal provided from the pixel array 140, compare it to the ramp signal, and convert the analog image signal (data) into a digital image signal (data) on the basis of the comparison results.

Figure 2:
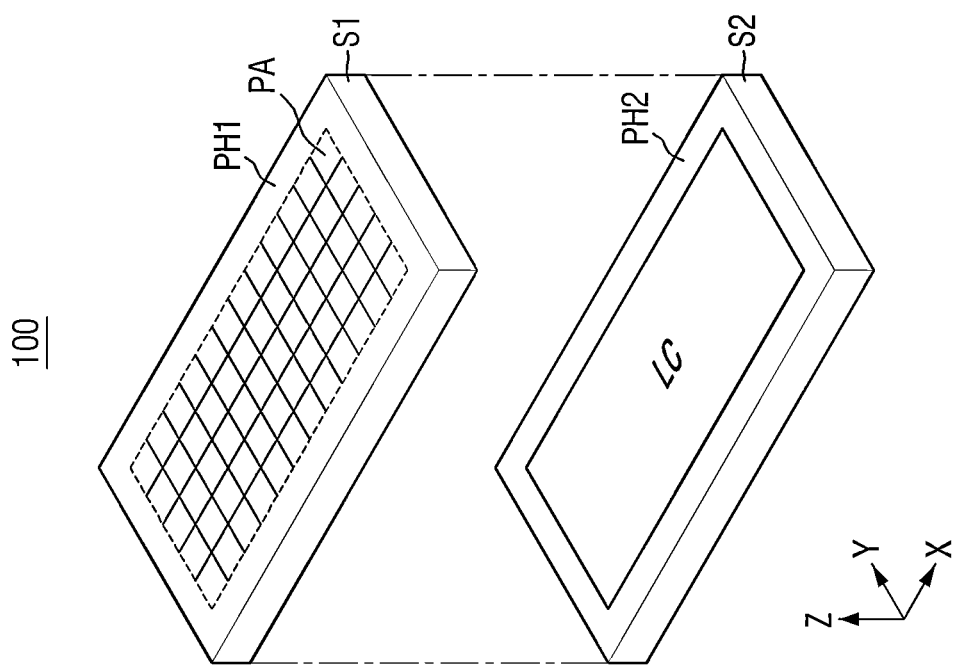
FIG. 2 is a diagram showing a conceptual layout of the image sensor of FIG. 1.

FIG. 2 is a diagram showing a conceptual layout of the image sensor of FIG. 1.

Referring to FIG. 2, the image sensor 100 may include first and second regions S1 and S2 stacked in a third direction Z. The first and second regions S1 and S2 may extend in a first direction X and a second direction Y as shown, and blocks shown in FIG. 1 may be placed in the first and second regions S1 and S2.

Although not shown in the drawing, a third region in which the memory is placed may be placed below the second region S2. At this time, the memory placed in the third region receives the image data from the first and second regions S1 and S2, and stores or processes the image data, and transmit the image data to the first and second regions S1 and S2 again. At this time, the memory may include a memory element such as a DRAM (dynamic random access memory) element, a SRAM (static random access memory) element, a STT-MRAM (spin transfer torque magnetic random access memory) element, and a flash memory element. When the memory includes, for example, a DRAM element, the memory may receive and process the image data at a relatively high speed. Also, in some example embodiments, the memory may also be placed in the second region S2.

The first region S1 may include a pixel array region PA and a first peripheral region PH1, and the second region S2 may include a logic circuit region LC and a second peripheral region PH2. The first and second regions S1 and S2 may be placed to be sequentially stacked one above the other.

In the first region S1, the pixel array region PA may be a region in which the pixel array (140 of FIG. 1) explained referring to FIG. 1 is placed. The pixel array region PA may include a plurality of unit pixels arranged in a matrix form. Each pixel may include a photo diode and a transistor. A more specific description thereof will be provided below.

The first peripheral region PH1 may include a plurality of pads, and may be placed around the pixel array region PA. The plurality of pads may transmit and receive electrical signals to and from an external device or the like.

In the second region S2, the logic circuit region LC may include electronic elements including a plurality of transistors. The electronic elements included in the logic circuit region LC may be electrically connected to the pixel array region PA to provide a constant signal to each unit pixel PX of the pixel array region PA or control the output signal.

For example, the control register block 110, the timing generator 120, the row driver 130, the readout circuit 150, the ramp signal generator 160, the buffer 170, and the like explained referring to FIG. 1 may be placed in the logic circuit region LC. For example, blocks other than the pixel array 140 among the blocks of FIG. 1 may be placed in the logic circuit region LC.

In the second region S2, the second peripheral region PH2 may also be placed in the region corresponding to the first peripheral region PH1 of the first region S1. However, some example embodiments are not limited thereto.

Figure 3:
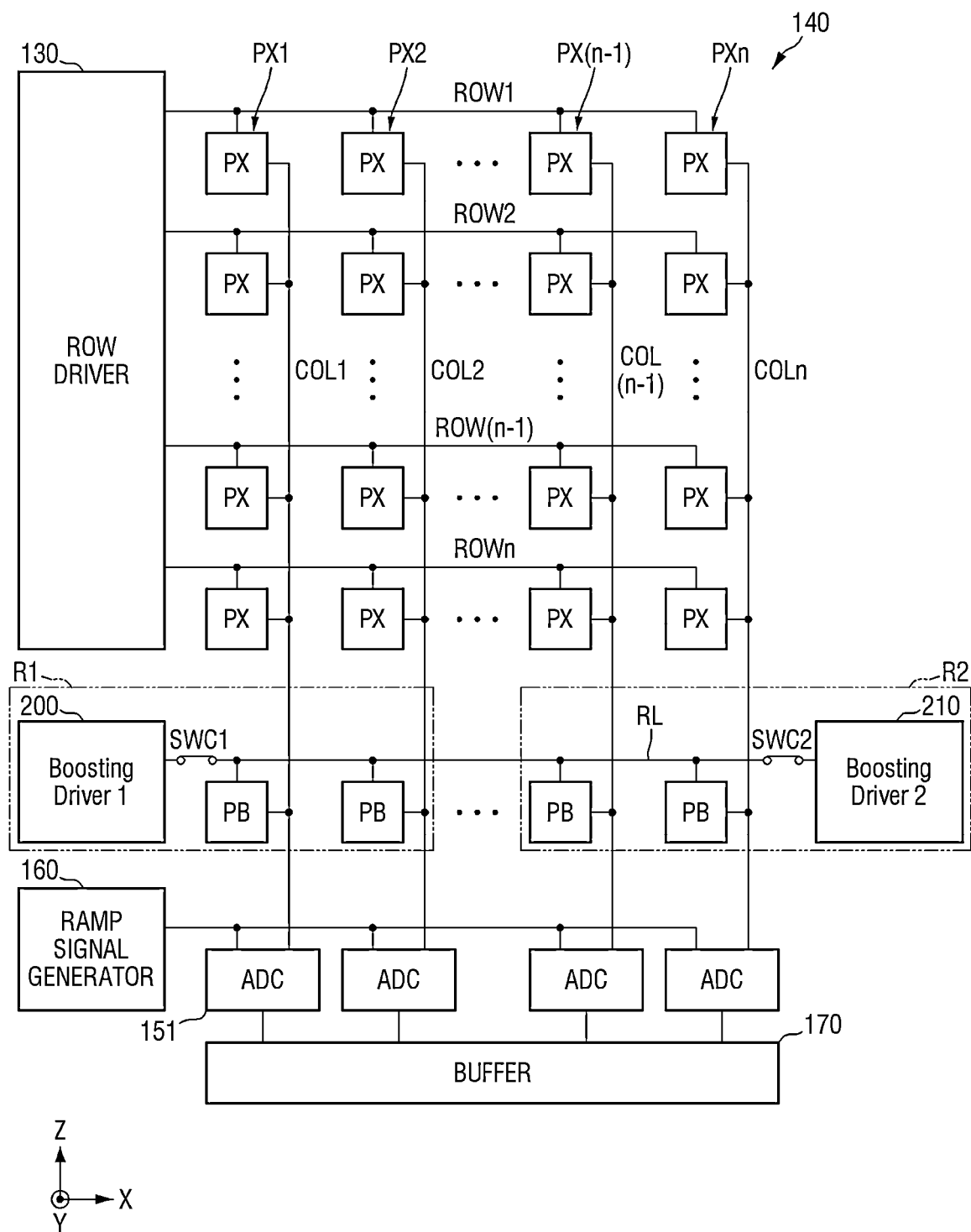
FIG. 3 is a diagram for explaining an image sensor according to some example embodiments.
Figure 4:
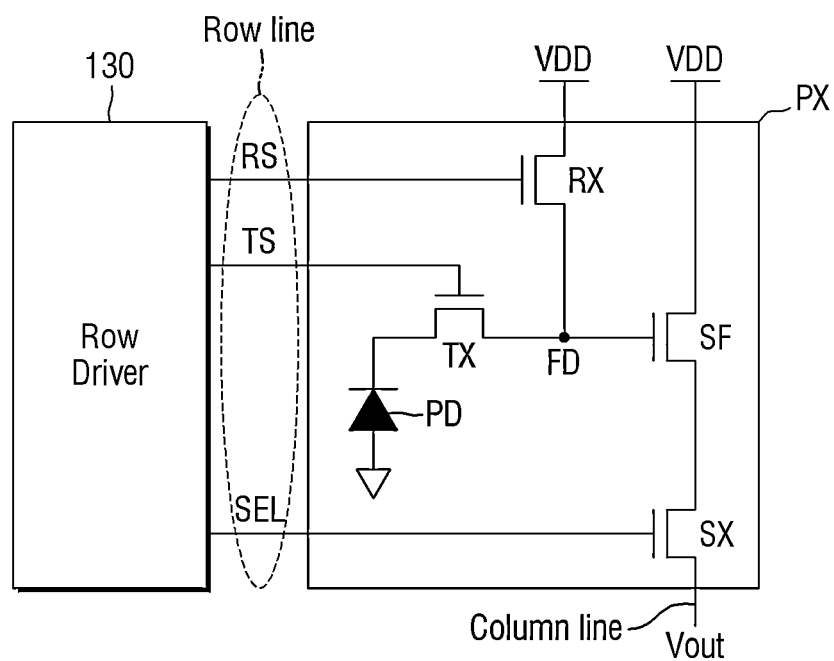
FIG. 4 is a diagram for explaining the pixels of FIG. 3.

FIG. 3 is a diagram for explaining an image sensor according to some example embodiments. FIG. 4 is a diagram for explaining the pixels of FIG. 3.

Referring to FIGS. 3 and 4, the image sensor 100 may include a row driver 130 (e.g., "first row driver"), row lines ROW1 to ROWn, column lines COL1 to COLn, a pixel array 140, a first boosting driver 200, a second boosting driver 210, a plurality of boosting circuits PB, a ramp signal generator 160, an analog-to-digital converter 151, a buffer 170 and the like.

As shown, the row lines ROW1 to ROWn may be connected to the row driver 130 and may extend in the first direction X. The row driver 130 may drive the pixel array 140 row by row. The row driver 130 may generate a transfer control signal TS, a reset control signal RS, a selection control signal SEL, and the like and provide them to the pixel PX of the pixel array 140.

The pixel array 140 may include a plurality of pixels PX. Here, the pixels PX may be arranged in a lattice form along a large number of rows and columns. The pixel array 140 may detect light, using the plurality of pixels PX, and convert light into an electrical signal to generate an image signal.

A plurality of row lines ROW1 to ROWn may extend in the first direction X. The plurality of row lines ROW1 to ROWn may be sequentially arranged in the third direction Z. For example, the first row line ROW1 may be spaced apart from (e.g., isolated from direct contact with) the second row line ROW2 in the third direction Z. A plurality of column lines COL1 to COLn may extend in the third direction Z. The plurality of column lines COL1 to COLn may be sequentially arranged in the first direction X. For example, the second column line COL2 may be spaced apart from (e.g., isolated from direct contact with) the first column line COL1 in the first direction X. However, some example embodiments of the present inventive concepts are not limited thereto. As used in at least FIG. 3, "n" may be any positive integer. In some example embodiments, "n" may be equal to or greater than 4.

The plurality of pixels PX may be connected to the row lines ROW1 to ROWn and the column lines COL1 to COLn. For example, a single pixel PX may be connected to both the first row line ROW1 and the first column line COL1. Further, the pixel PX may be located at an intersection part between the first row line ROW1 and the first column line COL1. The plurality of pixels PX may be arranged in a lattice form accordingly. As shown in FIG. 3, when "n" is equal to or greater than 4, a first pixel PX1, a second pixel PX2, a third pixel PX(n-1), and a fourth pixel PXn are connected to the first row line ROW1 and are sequentially arranged in the first direction X, a first column line COL1 may be connected to the first pixel PX1 and may be configured to receive a first output signal from the first pixel PX1, a second column line COL2 may be connected to the second pixel PX2 and may be configured to receive a second output signal from the second pixel PX2, a third column line COL(n-1) may be connected to the third pixel PX(n-1) and may be configured to receive a third output signal from the third pixel PX(n-1), and a fourth column line COLn may be connected to the fourth pixel PXn and may be configured to receive a fourth output signal from the fourth pixel PXn.

Referring to FIG. 4, the pixel PX may include a photoelectric conversion element (e.g., photo diode PD) that is configured to receive (e.g., absorb and/or photoelectrically convert) incident light, a transfer transistor TX, a reset transistor RX, a source follower SF, and a selection transistor SX. Here, the pixel PX may be a unit that constitutes the pixel array 140 or the pixel array region PA.

One end of the transfer transistor TX may be connected to the photo diode PD, and the other end may be connected to the floating diffusion region FD. The control electrode of the transfer transistor TX may receive the transfer control signal TS. Here, light incident on the image sensor 100 may be converted into an electric signal through a photo diode PD. The converted electrical signal may be transferred to the floating diffusion region FD through the transfer transistor TX.

One end of the reset transistor RX receives the power supply voltage VDD, and the other end may be connected to the floating diffusion region FD. The control electrode of the reset transistor RX may receive the reset control signal RS. One end of the source follower SF may receive the power supply voltage VDD, and the other end may be connected to one end of the selection transistor SX. The control electrode of the source follower SF may be connected to the floating diffusion region FD. The other end of the selection transistor SX is connected to the column lines COL1 to COLn, and the control electrode may receive the selection control signal SEL.

Each of the control signals TS, RS, and SEL which control each of the transistors TX, RX, and SX may be output from the row driver 130. An output signal Vout of the selection transistor SX may be supplied to the column lines COL1 to COLn. The output signal Vout may correspond to an analog signal. That is, the output signal Vout that is output from the pixel PX may be converted into a digital signal through the readout circuit 150, and may be transferred to the image signal processor 900 as an image signal IMS. Accordingly, a given pixel (e.g., first pixel PX1) may include a photoelectric conversion element (e.g., photodiode PD) that is configured to receive incident light and a transfer transistor TX that connects the photoelectric conversion element to a corresponding connected column line (e.g., first column line COL1 for the first pixel PX1), where the transfer transistor TX of the pixel PX is configured to operate in response to a transfer control signal TS received from the row driver 130. As shown in FIG. 4, the given pixel PX may include a reset transistor RX which connects the voltage source VDD and the corresponding connected column line (e.g., first column line COL1 for the first pixel PX1) and is configured to operate in response to the reset control signal RS received from the row driver 130.

Here, the row lines ROW1 to ROWn of FIG. 3 may be signal lines that transfer the transfer control signal TS, the reset control signal RS, and the selection control signal SEL from the row driver 130 to the pixel PX. Further, the column lines COL1 to COLn of FIG. 3 may be signal lines that transfer the output signal Vout of the selection transistor SX.

Referring to FIG. 3 again, the plurality of column lines COL1 to COLn may be connected to the analog-to-digital converter 151. Here, the analog-to-digital converter 151 may also be connected to the ramp signal generator 160. That is, the analog-to-digital converter 151 may receive the ramp signal from the ramp signal generator 160, and may receive the output signal Vout from the plurality of column lines COL1 to COLn. The analog-to-digital converter 151 may perform a CDS (correlation double sampling) operation, a counting operation, and the like to convert the output signal Vout, which is an analog signal, into a digital signal. Here, the analog-to-digital converter 151 may be included in the readout circuit 150 of FIG. 1. As shown in FIG. 3, the boosting circuits PB, or a single boosting circuit PB that is connected to the column lines COL1 to COLn, may be between the analog-to-digital converter 151 and the pixels PX (e.g., pixels PX1 to PXn that are connected to the first row line ROW1). The readout circuit 150 including the analog-to-digital converter 151 may be spaced apart from (e.g., isolated from direct contact with) the pixel array 140 in a direction opposite to the third direction Z. While FIG. 3 illustrates multiple "ADC" analog-to-digital converters 151 connected to separate, respective column lines, it will be understood that the multiple "ADC" analog-to-digital converters 151 shown in FIG. 3 may collectively represent a single analog-to-digital converter 151 that is connected to the column lines COL1 to COLn. For example, when "n" is equal to or greater than 4, the analog-to-digital converter 151 may be connected to the first to fourth column lines COL1 to COLn, and the analog-to-digital converter 151 may be configured to receive first to fourth output signals from the first to fourth pixels PX1 to PXn via the first to fourth column lines COL1 to COLn and convert the received first to fourth output signals into digital signals. Further, a plurality of analog-to-digital converters 151 may be sequentially arranged along the first direction X. That is, the analog-to-digital converter 151 may be placed to correspond to each pixel PX.

The buffer 170 may be connected to a plurality of analog-to-digital converters 151 and/or to a single analog-to-digital converter 151 that is connected to the column lines COL1 to COLn, and may provide a converted digital signal from the analog-to-digital converter 151. The buffer 170 may be placed in the direction opposite to the third direction Z from the analog-to-digital converter 151.

The row line RL may be placed between the pixel array 140 and the analog-to-digital converter 151. The row line RL may extend in the first direction X. For example, the row line RL may be formed to be parallel to a plurality of row lines ROW1 to ROWn. The row line RL may include a first terminal in the direction opposite to the first direction X, and a second terminal in the first direction X. That is, the row line RL may extend along the first direction X from the first terminal to the second terminal.

Figure 5:
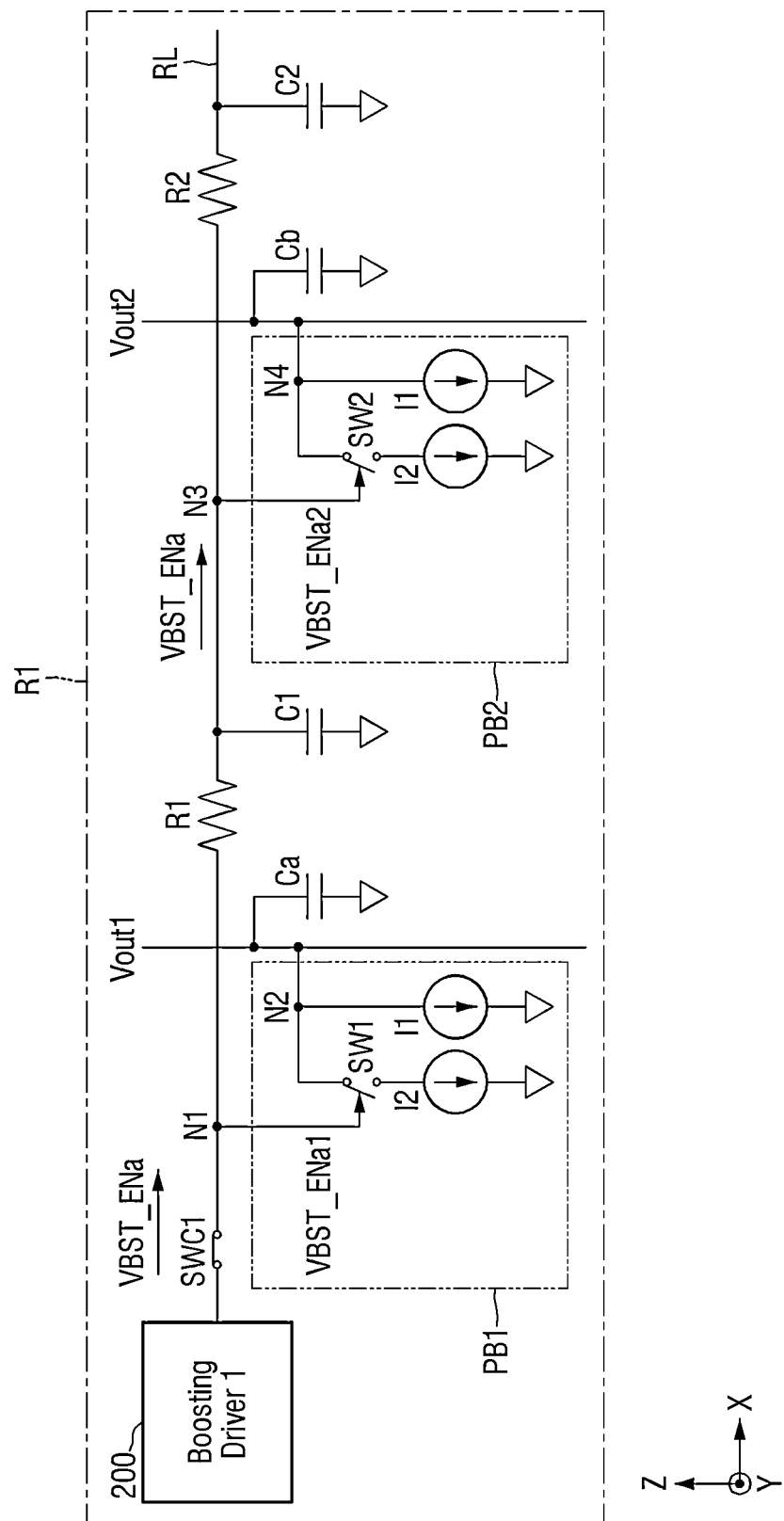
FIG. 5 is an enlarged view of a region R1 of FIG. 3.
Figure 6:
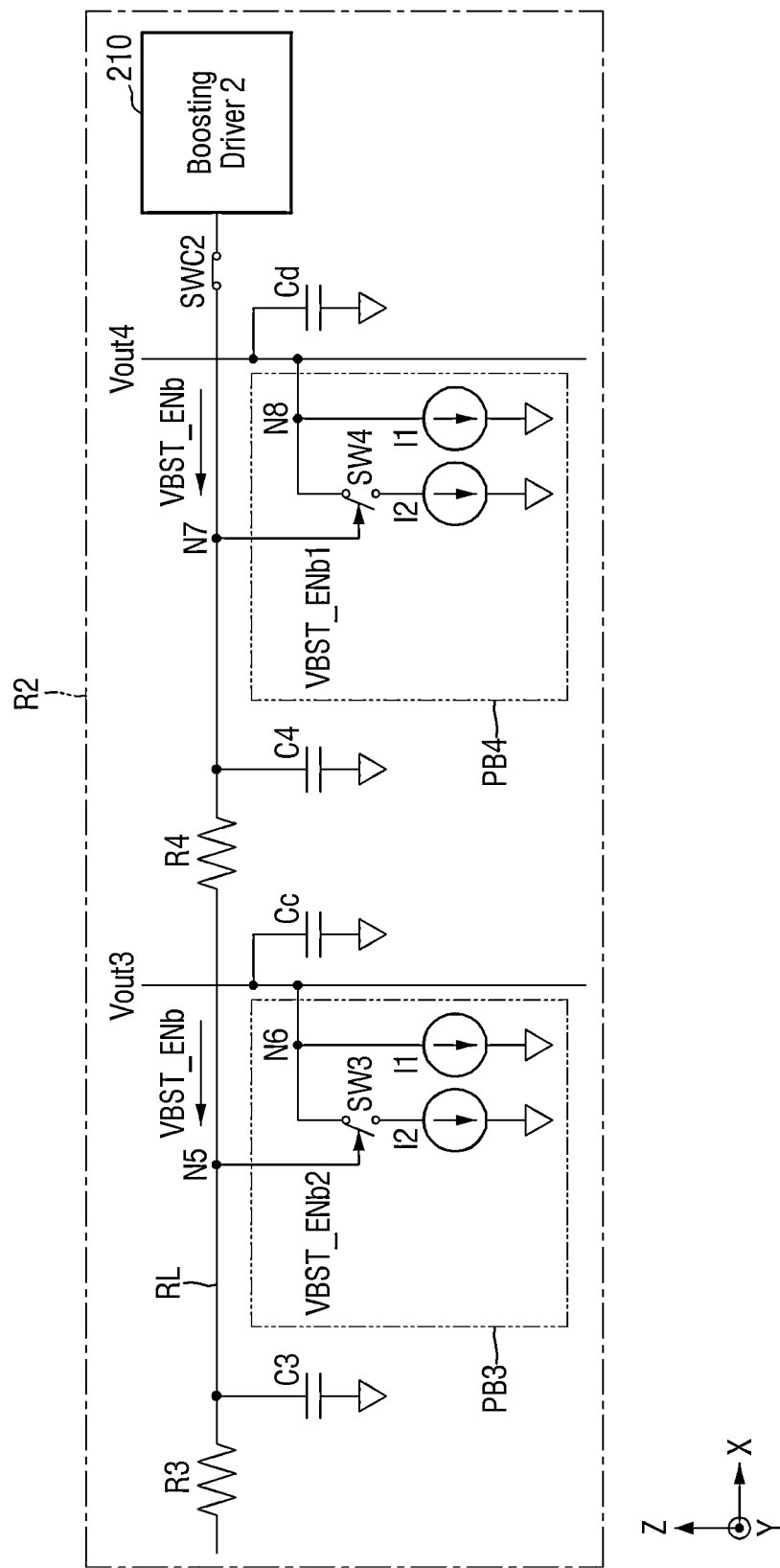
FIG. 6 is an enlarged view of a region R2 of FIG. 3.

A plurality of boosting circuits PB may be connected to a plurality of column lines COL1 to COLn. That is, the boosting circuits PB may be sequentially arranged in the first direction X. For example, the boosting circuit PB may be placed one by one to correspond to each of the column lines COL1 to COLn. The boosting circuits PB may be connected to the row line RL. That is, the boosting circuit PB may be connected to both the row line RL and the column lines COL1 to COLn. Further, the boosting circuit PB may be located at the intersection part between the row line RL and the column lines COL1 to COLn. The boosting circuits PB may be referred to herein as a single boosting circuit PB. For example, where n≥4, boosting circuits PB may be referred to as a boosting circuit PB that is connected to the first to fourth column lines COL1 to COLn, and a row line RL (also referred to herein as a second row line) may be connected to the boosting circuit PB and may extend in the first direction X. The multiple boosting circuits PB shown in FIG. 3 may represent multiple sub-boosting circuits of a single boosting circuit that is connected to the column lines COL1 to COLn. For example, as shown in FIG. 3, a single boosting circuit PB that is connected to the column lines COL1 to COLn, where n≥4, may include a first sub-boosting circuit connected between the first column line and the second row line (e.g., PB1 as shown in FIG. 5), a second sub-boosting circuit connected between the second column line and the second row line e.g., PB2 as shown in FIG. 5), a third sub-boosting circuit connected between the third column line and the second row line (e.g., PB3 as shown in FIG. 6), and a fourth sub-boosting circuit connected between the fourth column line and the second row line (e.g., PB4 as shown in FIG. 6).

The first boosting driver 200 may be connected to the row line RL. Specifically, the first boosting driver 200 may be connected to the first terminal of the row line RL in the direction opposite to the first direction X. Further, the first boosting driver 200 may be placed apart from the plurality of boosting circuits PB in the direction opposite to the first direction X. In addition, the first boosting driver 200 may be connected to a plurality of boosting circuits PB through the row line RL.

The second boosting driver 210 may be connected to the row line RL. Specifically, the second boosting driver 210 may be connected to the second terminal of the row line RL (which is opposite to the first terminal of the row line RL) in the first direction X. As shown in FIG. 3, the first and second boosting drivers 200 and 210 are connected to opposite ends of the row line RL. Further, the second boosting driver 210 may be placed to be spaced apart from (e.g., isolated from direct contact with) the plurality of boosting circuits PB in the first direction X. The second boosting driver 210 may be connected to the plurality of boosting circuits PB through the row line RL.

The row line RL and the plurality of boosting circuits PB may be placed between the first boosting driver 200 and the second boosting driver 210. That is, the row driver 130 is placed to be spaced apart from (e.g., isolated from direct contact with) the pixel array 140 in the direction opposite to the first direction X, whereas the first and second boosting drivers 200 and 210 may be located on both sides of the row line RL and the plurality of boosting circuits PB. Also, the first and second boosting drivers 200 and 210 may be placed symmetrically.

The first switch SWC1 may connect the row line RL and the first boosting driver 200. The first switch SWC1 may be placed between the row line RL and the first boosting driver 200. In some example embodiments, the first switch SWC1 may be in a closed state. That is, the first boosting driver 200, the row line RL, and the boosting circuit PB may be connected by the closed first switch SWC1. However, some example embodiments of the present inventive concepts are not limited thereto.

The second switch SWC2 may connect the row line RL and the second boosting driver 210. That is, the second switch SWC2 may be placed between the row line RL and the second boosting driver 210. In some example embodiments, the second switch SWC2 may be in the closed state. That is, the second boosting driver 210, the row line RL, and the boosting circuit PB may be connected by the closed second switch SWC2. However, some example embodiments of the present inventive concepts are not limited thereto.

The first boosting driver 200 may control the boosting circuit PB to be turned on or off, and the boosting circuit PB may adjust the voltage of the output signal Vout that is output from the column lines COL1 to COLn in response to the control of the first boosting driver 200. For example, where n≥4, the boosting circuits PB may be referred to collectively as a boosting circuit PB that is configured to adjust a voltage of the first and second output signals (received from the first and second pixels PX1 and PX2 via the first and second column lines COL1 and COL2) based on a first boosting enable signal received from the first boosting driver 200. Also, the second boosting driver 210 may control the boosting circuits PB to be turned on or off, and the boosting circuits PB may adjust the voltage of the output signal Vout that is output from the column lines COL1 to COLn in response to the control of the second boosting driver 210. For example, where n≥4, the boosting circuits PB may be referred to collectively as a boosting circuit PB that is configured to adjust a voltage of the third and fourth output signals (received from the third and fourth pixels PX(n−1) and PXn via the column lines COL(n−1) and COLn) based on a first boosting enable signal received from the second boosting driver 210. In some example embodiments, the boosting circuits PB may be referred to as separate boosting circuits PB that are connected to separate, respective column lines and are each configured to adjust a voltage of a separate output signal received from a separate pixel PX via the separate column line to which the separate boosting circuit PB is connected.

FIG. 5 is an enlarged view of a region R1 of FIG. 3. FIG. 6 is an enlarged view of a region R2 of FIG. 3.

Referring to FIG. 5, in the region R1, the first boosting driver 200 may be connected to the first boosting circuit PB1 and the second boosting circuit PB2 through the row line RL. In some example embodiments, the first and second boosting circuits PB1 and PB2 may be considered to be part of a single booster circuit PB that is connected to column lines COL1 to COLn. In some example embodiments, the first boosting circuit PB1 may be referred to as a first sub-boosting circuit, of a single boosting circuit PB, that is connected between a first column line COL1 and the row line RL. In some example embodiments, the second boosting circuit PB2 may be referred to as a second sub-boosting circuit, of a single boosting circuit PB, that is connected between a second column line COL2 and the row line RL. Here, the row line RL may include parasitic resistors R1 and R2, and parasitic capacitors C1 and C2. The parasitic resistors R1 and R2 and the parasitic capacitors C1 and C2 may be due to the natural characteristics of the row line RL. The parasitic resistor R1 and the parasitic capacitor C1 may exist between a first node N1, to which the first boosting circuit PB1 and the row line RL are connected, and a third node N3 to which the second boosting circuit PB2 and the row line RL are connected. Further, the parasitic resistor R2 and the parasitic capacitor C2 may be connected to the third node N3.

A boosting enable signal VBST_ENa that is output from the first boosting driver 200 may be transferred by being delayed with the parasitic resistors R1 and R2 and the parasitic capacitors C1 and C2. That is, the boosting enable signal VBST_ENa may be delayed by the RC delay. For example, a first boosting enable signal VBST_ENa1 transferred to the first boosting circuit PB1 may reach before a second boosting enable signal VBST_ENa2 transferred to the second boosting circuit PB2. That is, the first boosting circuit PB1 may operate earlier than the second boosting circuit PB2.

The first boosting driver 200 may output the boosting enable signal VBST_ENa that operates a plurality of boosting circuits PB to the row line RL. The boosting enable signal VBST_ENa is transferred along the row line RL and may be delayed. Although the boosting enable signal VBST_ENa may be transferred in the first direction X, some example embodiments of the present inventive concepts are not limited thereto.

The first boosting circuit PB1 may include a first current source I1, a second current source I2, and a first switch SW1. The first current source I1 may be connected to a second node N2 of the first column line COL1 and thus connected to the first column line COL1, and the first switch SW1 may be connected to the second node N2 of the first column line COL1 and thus connected to the first column line COL1. Further, the second current source I2 may be connected to the first switch SW1. That is, the first switch SW1 may connect the second current source I2 and the second node N2. The first switch SW1 may operate in response to the first boosting enable signal VBST_ENa1 transferred from the row line RL (e.g., transferred through the row line RL). That is, when the first boosting enable signal VBST_ENa1 is applied, the first switch SW1 may be closed. However, if the first boosting enable signal VBST_ENa1 is not applied, the first switch SW1 may be opened.

The first current source I1 may generate a constant current, and the second current source I2 may also generate a constant current. That is, when the first boosting enable signal VBST_ENa1 is not applied, only the current generated from the first current source I1 may flow through the second node N2. However, when the first boosting enable signal VBST_ENa1 is applied, the overall currents generated from the first current source I1 and the second current source I2 may flow through the second node N2. Because the overall currents generated from the first current source I1 and the second current source I2 flow, the voltage of the first output signal Vout1 may be adjusted. That is, the first boosting circuit PB1 may be operated by the first boosting enable signal VBST_ENa1 that is output from the first boosting driver 200, and the voltage of the first output signal Vout1 may be adjusted. At this time, the first column line COL1 has a capacitor Ca. When a transfer control signal TS or a reset control signal RS is applied to the pixel PX, the voltage of the first output signal Vout1 may increase temporarily. The first boosting circuit PB1 may reduce the voltage of the increased first output signal Vout1, after the transfer control signal TS or the reset control signal RS is applied. Specifically, the first boosting circuit PB1 may be boosted so that the voltage of the first output signal Vout1 decreases faster.

A second boosting circuit PB2 may also include a first current source I1, a second switch SW2 and a second current source I2 connected to the fourth node N4 of the second column line COL2. The second switch SW2 may be turned on or off by the second boosting enable signal VBST_ENa2. That is, the second boosting circuit PB2 may be boosted so that the voltage of the second output signal Vout2 decreases faster. At this time, the second boosting enable signal VBST_ENa2 may reach the second boosting circuit PB2 after the first boosting enable signal VBST_ENa1. Accordingly, the second boosting circuit PB2 may operate after the first boosting circuit PB1. A boosting enable signal VBST_ENa may then be transferred in the first direction X along the row line RL. At this time, the second column line COL2 has a capacitor Cb.

Referring to FIG. 6, in the region R2, the second boosting driver 210 may be connected to a third boosting circuit PB3 and a fourth boosting circuit PB4 through the row line RL. In some example embodiments, the third and fourth boosting circuits PB3 and PB4 may be considered to be part of a single booster circuit PB that is connected to column lines COL1 to COLn. In some example embodiments, the third boosting circuit PB3 may be referred to as a third sub-boosting circuit, of a single boosting circuit PB, that is connected between a third column line COL(n−1) and the row line RL. In some example embodiments, the fourth boosting circuit PB4 may be referred to as a fourth sub-boosting circuit, of a single boosting circuit PB, that is connected between a fourth column line COLn and the row line RL. Here, the row line RL may include parasitic resistors R3 and R4 and parasitic capacitors C3 and C4. The parasitic resistor R4 and the parasitic capacitor C4 may exist between a fifth node N5, to which the third boosting circuit PB3 and the row line RL are connected, and a seventh nodes N7 to which the fourth boosting circuit PB4 and the row line RL are connected. Further, the parasitic resistor R3 and the parasitic capacitor C3 may be connected to the fifth node N5.

A boosting enable signal VBST_ENb which is output from the second boosting driver 210 may be transferred by being delayed with the parasitic resistors R3 and R4 and the parasitic capacitors C3 and C4. That is, the boosting enable signal VBST_ENb may be delayed by the RC delay. For example, a first boosting enable signal VBST_ENb1 transferred to the fourth boosting circuit PB4 may reach before a second boosting enable signal VBST_ENb2 transferred to the third boosting circuit PB3. That is, the third boosting circuit PB3 may operate earlier than the fourth boosting circuit PB4. Here, the first to fourth boosting circuits PB1 to PB4 may be sequentially arranged along the first direction X.

The second boosting driver 210 may output the boosting enable signal VBST_ENb that operates a plurality of boosting circuits PB to the row line RL. The boosting enable signal VBST_ENb is transferred along the row line RL and may be delayed. Although the boosting enable signal VBST_ENb may be transferred in the direction opposite to the first direction X, some example embodiments of the present inventive concepts are not limited thereto.

Referring to FIGS. 5 and 6, in some example embodiments the image sensor 100 may be configured to delay the boosting enable signal VBST_ENa in relation to the boosting enable signal VBST_ENb such that the image sensor 100 is configured to cause the boosting enable signal VBST_ENb to be applied, as boosting enable signal VBST_ENb2, to the sub-boosting circuit connected to the column line COL(N−1) (e.g., boosting circuit PB3) before the boosting enable signal VBST_ENa is applied, as boosting enable signal VBST_ENa1, to the sub-boosting circuit connected to the column line COL1 (e.g., boosting circuit PB1) and before the boosting enable signal VBST_ENb is applied to the sub-boosting circuit connected to the column line COL1 (e.g., boosting circuit PB1).

The fourth boosting circuit PB4 may include a first current source I1, a fourth switch SW4 and a second current source I2 connected to an eighth node N8 of the fourth column line COLn. The fourth switch SW4 may be turned on or off by the first boosting enable signal VBST_ENb1. That is, the fourth boosting circuit PB4 may be boosted so that the voltage of the fourth output signal Vout4 decreases faster. At this time, the fourth column line COLn has a capacitor Cd.

The third boosting circuit PB3 may also include a first current source I1, a third switch SW3 and a second current source I2 connected to a sixth node N6 of the third column line COL(n−1). The third switch SW3 may be turned on or off by the second boosting enable signal VBST_ENb2. That is, the third boosting circuit PB3 may be boosted so that the voltage of the third output signal Vout3 decreases faster. At this time, the second boosting enable signal VBST_ENb2 may reach the third boosting circuit PB3 after the first boosting enable signal VBST_ENb1. Accordingly, the third boosting circuit PB3 may operate after the fourth boosting circuit PB4. The boosting enable signal VBST_ENb may then be transferred along the row line RL in the direction opposite to the first direction X. At this time, the third column line COL(n−1) has a capacitor Cc.

A decrease in voltage of the first to fourth output signals Vout1 to Vout4 applied to the plurality of column lines COL1 to COLn may be boosted by the boosting enable signal VBST_ENa that is output from the first boosting driver 200 and the boosting enable signal VBST_ENb that is output from the second boosting driver 210. Here, the boosting enable signal VBST_ENa is transferred from the first boosting driver 200 in the first direction X along the row line RL, and the boosting enable signal VBST_ENb is transferred from the second boosting driver 210 along the row line RL in the direction opposite to the first direction X. Accordingly, the symmetry of the boosting circuit PB may be improved, and the settling time may be improved. A more detailed explanation thereof will be provided later.

Figure 7:
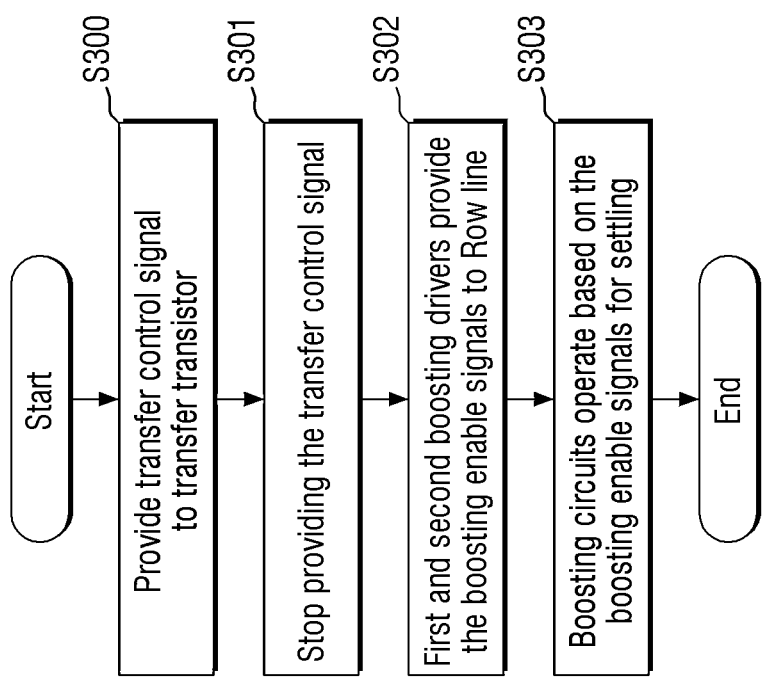
FIG. 7 is a flowchart for explaining the operation of the image sensor according to some example embodiments.
Figure 8:
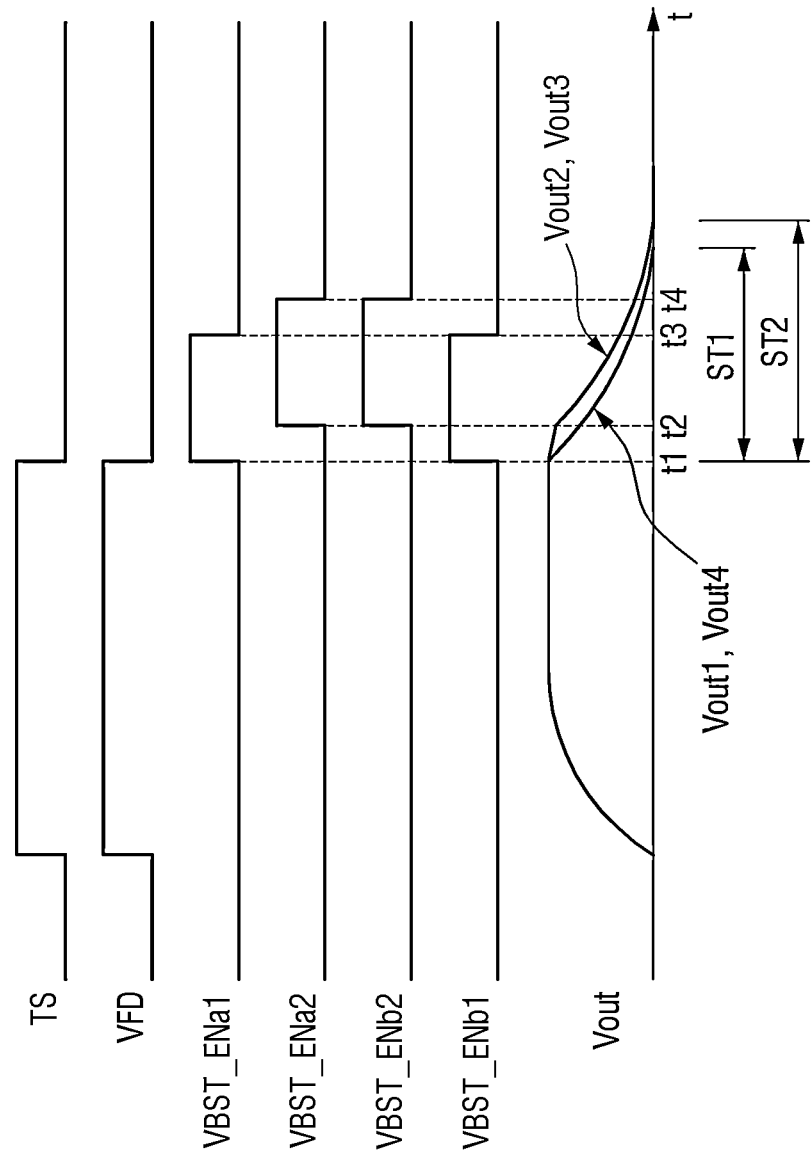
FIG. 8 is a timing diagram for explaining the operation of the image sensor according to some example embodiments.

FIG. 7 is a flowchart for explaining the operation of the image sensor according to some example embodiments. FIG. 8 is a timing diagram for explaining the operation of the image sensor according to some example embodiments.

Referring to FIGS. 3 to 8, the row driver 130 may provide a transfer control signal TS to the transfer transistor TX of the pixel PX (S300). For example, the row driver 130 may provide the transfer control signal TS to the transfer transistor TX of the pixel PX, and charges generated from the photo diode PD may be transferred to the floating diffusion region FD. That is, the floating diffusion voltage VFD of the floating diffusion region FD may increase. Further, the voltage of the output signal Vout of the column lines COL1 to COLn that receive the floating diffusion voltage VFD from the pixel PX may increase. However, the voltage of the output signal Vout may gradually increase, and a constant voltage may be maintained after a certain period of time.

The row driver 130 may interrupt the provision of the transfer control signals TS (S301). For example, the transfer control signal TS may not be applied to the transfer transistor TX at a first time t1. The floating diffusion voltage VFD may decrease accordingly. Also, the voltage of the output signal Vout may decrease, but it does not sharply decrease and may gradually decrease.

The first boosting driver 200 and the second boosting driver 210 may provide the row line RL with the boosting enable signals VBST_ENa and VBST_ENb (S302). As shown in FIG. 8, the boosting enable signals VBST_ENa and VBST_ENb may be outputted by the first boosting driver 200 and the second boosting driver 210 at S302 after the transfer control signal TS is applied (e.g., after the transfer control signal is provided at S300 and stopped at S301).

For example, the first boosting driver 200 may output the boosting enable signal VBST_ENa, the first boosting enable signal VBST_ENa1 may be transferred to the first boosting circuit PB1, and the second boosting enable signal VBST_ENa2 may be transferred to the second boosting circuit PB2. Here, the first boosting enable signal VBST_ENa1 may be applied from the first time t1 to the third time t3, and the second boosting enable signal VBST_ENa2 may be applied from the second time t2 to the fourth time t4. Here, the first boosting enable signal VBST_ENa1 may be transferred before the second boosting enable signal VBST_ENa2. That is, the first boosting circuit PB1 may operate earlier than the second boosting circuit PB2.

For example, the second boosting driver 210 may output the boosting enable signal VBST_ENb, the first boosting enable signal VBST_ENb1 may be transferred to the fourth boosting circuit PB4, and the second boosting enable signal VBST_ENb2 may be transferred to the third boosting circuit PB3. Here, the first boosting enable signal VBST_ENb1 may be applied from the first time t1 to the third time t3, and the second boosting enable signal VBST_ENb2 may be applied from the second time t2 to the fourth time t4. Here, the first boosting enable signal VBST_ENb1 may be transferred before the second boosting enable signal VBST_ENb2. That is, the fourth boosting circuit PB4 may operate earlier than the third boosting circuit PB3. In some example embodiments, the first and fourth boosting circuits PB1 and PB4 may operate earlier than either the second or third boosting circuits PB2 or PB3. In some example embodiments, the first and fourth boosting circuits PB1 and PB4 may operate during a same time (e.g., at least partially or exactly simultaneously or substantially simultaneously).

The first boosting enable signal VBST_ENa1 and the first boosting enable signal VBST_ENb1 may be transferred to the boosting circuit PB during the same time, and the second boosting enable signal VBST_ENa2 and the second boosting enable signal VBST_ENb2 may be transferred to the boosting circuit PB during the same time. That is, the second boosting enable signal VBST_ENa2 and the second boosting enable signal VBST_ENb2 may be transferred after the first boosting enable signal VBST_ENa1 and the first boosting enable signal VBST_ENb1. For example, the image sensor 100 may be configured to cause the first boosting enable signal VBST_ENa to be applied, as boosting enable signal VBST_ENa1, to the sub-boosting circuit connected between the column line COL1 and the row line RL (e.g., boosting circuit PB1) at a first time and to cause the second boosting enable signal VBST_ENb to be applied, as boosting enable signal VBST_ENb1, to the sub-boosting circuit connected between the column line COLn and the row line RL (e.g., boosting circuit PB4) at the same first time, such that the first and second boosting enable signals VBST_ENa and VBST_ENb are applied to the first and fourth sub-boosting circuits, respectively, at a same first time (e.g., simultaneously or substantially simultaneously). In another example, the image sensor 100 may be configured to cause the first boosting enable signal VBST_ENa to be applied, as boosting enable signal VBST_ENa2, to the sub-boosting circuit connected between the column line COL2 and the row line RL (e.g., boosting circuit PB2) at a second time and to cause the second boosting enable signal VBST_ENb to be applied, as boosting enable signal VBST_ENb2, to the sub-boosting circuit connected between the column line COL(n−1) and the row line RL (e.g., boosting circuit PB3) at the same second time, such that the first and second boosting enable signals VBST_ENa and VBST_ENb are applied to the second and third sub-boosting circuits, respectively, at a same second time (e.g., simultaneously or substantially simultaneously). However, some example embodiments of the present inventive concepts are not limited thereto.

As shown in at least FIG. 8, the image sensor 100 may be configured to cause the respective switches SW1 and SW4 of the first and fourth boosting circuits PB1 and PB4 to close (based on the respective boosting enable signals VBST_ENa1 and VBST_ENb1) earlier than the respective switches SW2 and SW3 of the second and third boosting circuits PB2 and PB3 are closed (based on the respective boosting enable signals VBST_ENa2 and VBST_ENb2).

As further shown in at least FIG. 8, the image sensor is configured to, after the respective switches SW1 to SW4 of the first to fourth boosting circuits PB1 and PB4 are closed, cause the respective switches SW1 and SW4 of the first and fourth boosting circuits PB1 and PB4 to open (e.g., based on the stopping of the respective boosting enable signals VBST_ENa1 and VBST_ENb1) earlier than the respective switches SW2 and SW3 of the second and third boosting circuits PB2 and PB3 are opened (based on the stopping of the respective boosting enable signals VBST_ENa2 and VBST_ENb2).

The boosting circuits PB may operate on the basis of the boosting enable signal VBST_ENa and the boosting enable signal VBST_ENb (S303). Accordingly, the voltage of the output signal Vout applied to the column lines COL1 to COLn may be settled.

Referring to FIG. 8, the voltage of the first output signal Vout1 and the voltage of the fourth output signal Vout4 may be reduced by the first boosting enable signal VBST_ENa1 and the first boosting enable signal VBST_ENb1. That is, the voltage of the first output signal Vout1 and the voltage of the fourth output signal Vout4 may be reduced more rapidly. Accordingly, the voltage of the first output signal Vout1 and the voltage of the fourth output signal Vout4 may be settled after a first settling time interval ST1.

The voltage of the second output signal Vout2 and the voltage of the third output signal Vout3 may be reduced by the second boosting enable signal VBST_ENa2 and the second boosting enable signal VBST_ENb2. That is, the voltage of the second output signal Vout2 and the voltage of the third output signal Vout3 may be reduced more rapidly. Accordingly, the voltage of the second output signal Vout2 and the voltage of the third output signal Vout3 may be settled after a second settling time interval ST2. Here, the second settling time interval ST2 may be greater than the first settling time interval ST1. That is, the settling time interval of the voltage of the output signal Vout applied to the column lines COL1 to COLn may increase, as it goes away from the first and second boosting drivers 200 and 210.

In this case, when the boosting enable signal VBST_ENa and the boosting enable signal VBST_ENb are transferred in both directions from the first boosting driver 200 and the second boosting driver 210 located on both sides of the row line RL, the settling time interval of voltage of the output signal Vout applied to the column lines COL1 to COLn may be reduced generally. Accordingly, the asymmetry of the image sensor 100 may be improved, and the image quality of the image sensor 100 may be improved.

Also, boosting of the voltage of the output signal Vout may be further required when no light is incident on the photo diode PD. At this time, when the settling time interval of voltage of the output signal Vout decreases, the dark shading or dark offset of the image sensor 100 may be reduced. Further, when the settling time interval of voltage of the output signal Vout decreases, the image sensor 100 may operate at high speed.

Hereinafter, the operation of the image sensor 100 will be explained referring to FIG. 9.

Figure 9:
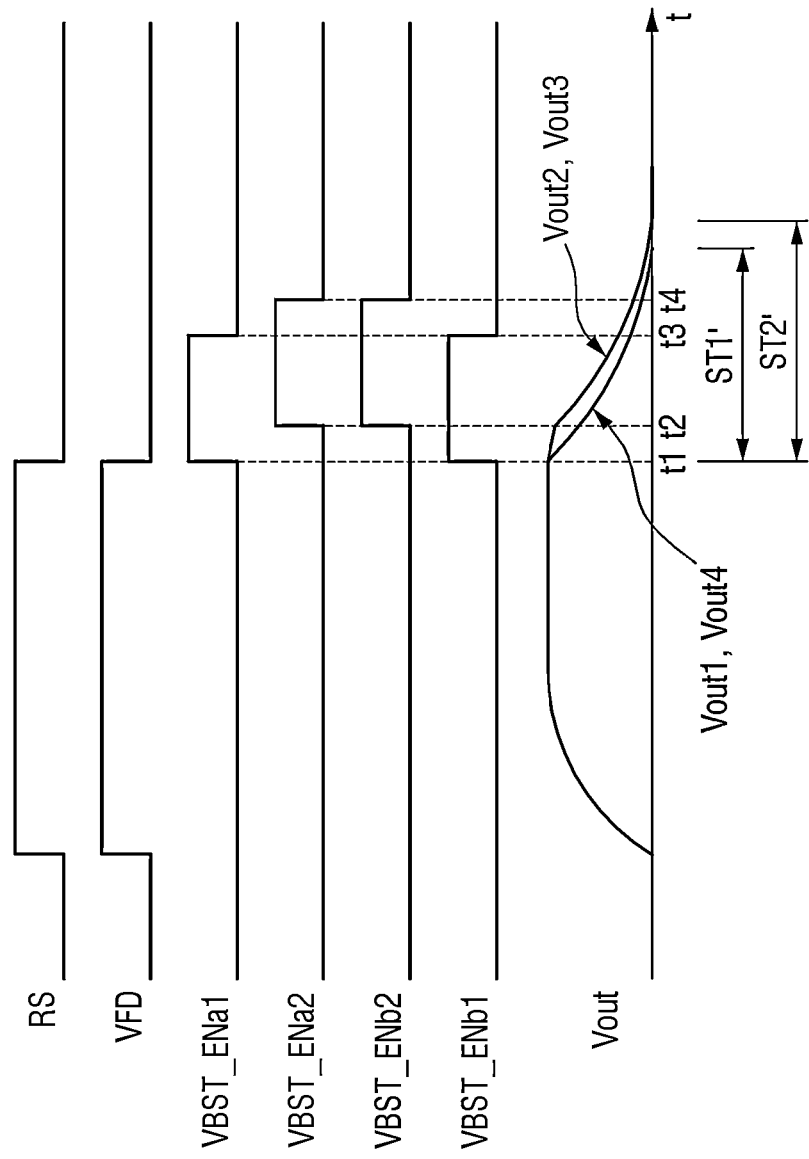
FIG. 9 is a timing diagram for explaining the operation of the image sensor according to some example embodiments.

FIG. 9 is a timing diagram for explaining the operation of the image sensor according to some example embodiments. For convenience of explanation, repeated parts of contents explained using FIGS. 1 to 8 will be briefly explained or omitted.

Referring to FIG. 9, the row driver 130 may provide a reset control signal RS to the reset transistor RX. For example, the row driver 130 may provide a reset control signal RS to the reset transistor RX of the pixel PX. Accordingly, the floating diffusion voltage VFD of the floating diffusion region FD may increase. Further, the voltage of the output signal Vout of the column lines COL1 to COLn that receive the floating diffusion voltage VFD from the pixel PX may increase. However, the voltage of the output signal Vout may gradually increase, and a constant voltage may be maintained after a certain period of time.

The row driver 130 may interrupt the provision of the reset control signal RS. For example, the reset control signal RS may not be applied to the reset transistor RX at the first time t1. The floating diffusion voltage VFD may decrease accordingly. Also, the voltage of the output signal Vout may decrease, but it does not sharply decrease and may gradually decrease.

The first boosting driver 200 and the second boosting driver 210 may provide the row line RL with the boosting enable signals VBST_ENa and VBST_ENb. Accordingly, the voltages of the first output signal Vout1 and the fourth output signal Vout4 may be settled during a first settling time interval ST1', and the voltage of the second output signal Vout2 and the third output signal Vout3 may be settled during a second settling time interval ST2'. That is, even when the reset control signal RS is applied to the pixel PX, the boosting circuit PB boosts the decrease in voltage of the output signal Vout of the column lines COL1 to COLn. As shown in FIG. 9, the boosting enable signals VBST_ENa and VBST_ENb may be outputted by the first boosting driver 200 and the second boosting driver 210 at S302 after the reset control signal RS is applied (e.g., after the reset control signal is provided and stopped as shown in FIG. 9).

Hereinafter, the operation of the image sensor 100 will be explained referring to FIGS. 10 to 12.

Figure 10:
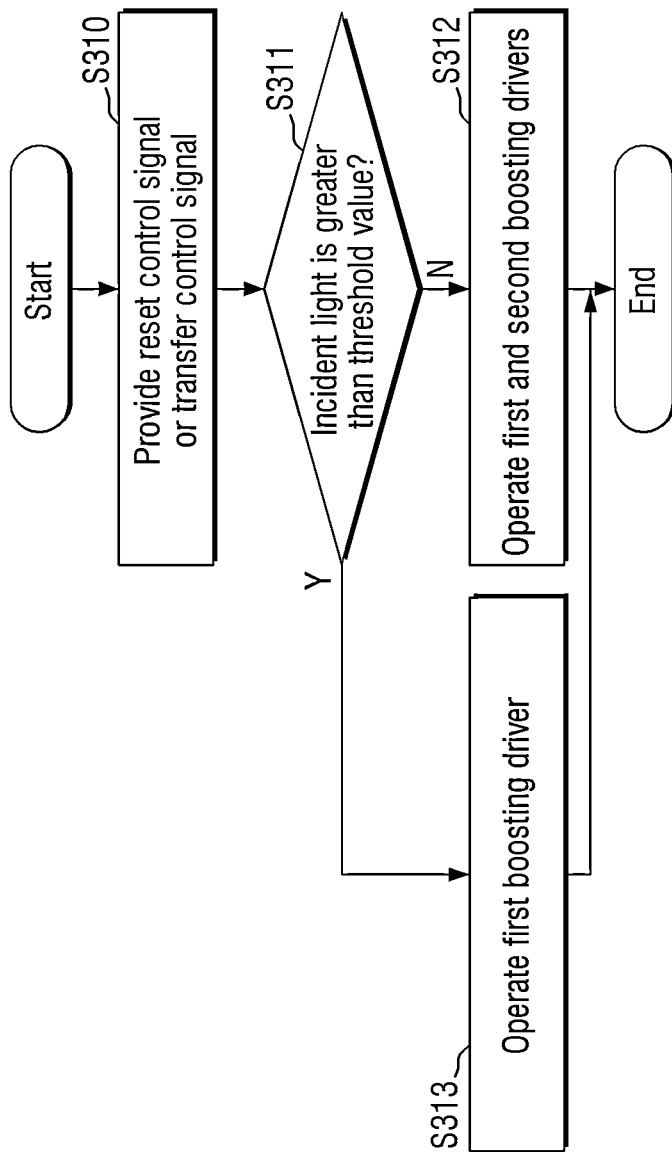
FIG. 10 is a flowchart for explaining the operation of the image sensor according to some example embodiments.

FIG. 10 is a flowchart for explaining the operation of the image sensor according to some example embodiments. FIG. 11 is a diagram of a region R2 for explaining the image sensor according to some example embodiments. FIG. 12 is a timing diagram for explaining the operation of the image sensor according to some example embodiments. For convenience of explanation, repeated parts of contents explained using FIGS. 1 to 9 will be briefly explained or omitted.

Referring to FIG. 10, the row driver 130 may provide the reset control signal RS to the reset transistor RX or provide the transfer control signal TS to the transfer transistor TX (S310). After that, the row driver 130 may interrupt the provision of the reset control signal RS or the transfer control signal TS to the pixel PX. Here, although it is assumed that the transfer control signal TS is provided to the pixel PX, some example embodiments of the present inventive concepts are not limited thereto. The voltage of the output signal Vout of the color lines COL1 to COLn may increase and become constant, while the transfer control signal TS is being provided.

The image sensor 100 may determine whether the incident light is greater than a threshold value (e.g., whether the intensity, illuminance, amount, etc. of the incident light is greater than an incident value) (S311). For example, the image sensor 100 may determine whether the incident light is greater than the threshold value, using another illuminance sensor or the like. However, some example embodiments of the present inventive concepts are not limited thereto, and the image sensor 100 may determine this by other methods.

If the incident light is not greater than (e.g., equal to or less than) the threshold value (S311-N), the image sensor 100 may operate the first boosting driver 200 and the second boosting driver 210 (S312). That is, both the first boosting driver 200 and the second boosting driver 210 may operate as explained referring to FIGS. 1 to 9. At this time, the first switch SWC1 and the second switch SWC2 may be closed. That is, the boosting circuit PB may be connected to the first boosting driver 200 through the first switch SWC1, and the boosting circuit PB may be connected to the second boosting driver 210 through the second switch SWC2.

If the incident light is greater than the threshold value (S311-Y), the image sensor 100 may operate the first boosting driver 200 (S313). That is, the second boosting driver 210 may not operate, and only the first boosting driver 200 may operate. If the incident light is greater than the threshold value, settling of voltage of the output signal Vout may be less important. Accordingly, only the first boosting driver 200 may be used, and dark shading and dark offset may not occur. As described herein, operating only the first boosting driver 200 at S313 may be referred to as the image sensor 100 operating in a first operating mode, and operating both the first and second boosting drivers 200 and 210 at S312 may be referred to as the image sensor operating in a second operating mode that is different from the first operating mode. As described herein, when the image sensor 100 is operating in the first operating mode, the boosting circuits PB may each be understood to operate in the first operating mode, and when the image sensor 100 is operating in the second operating mode, the boosting circuits PB may each be understood to operate in the second operating mode.

Figure 11:
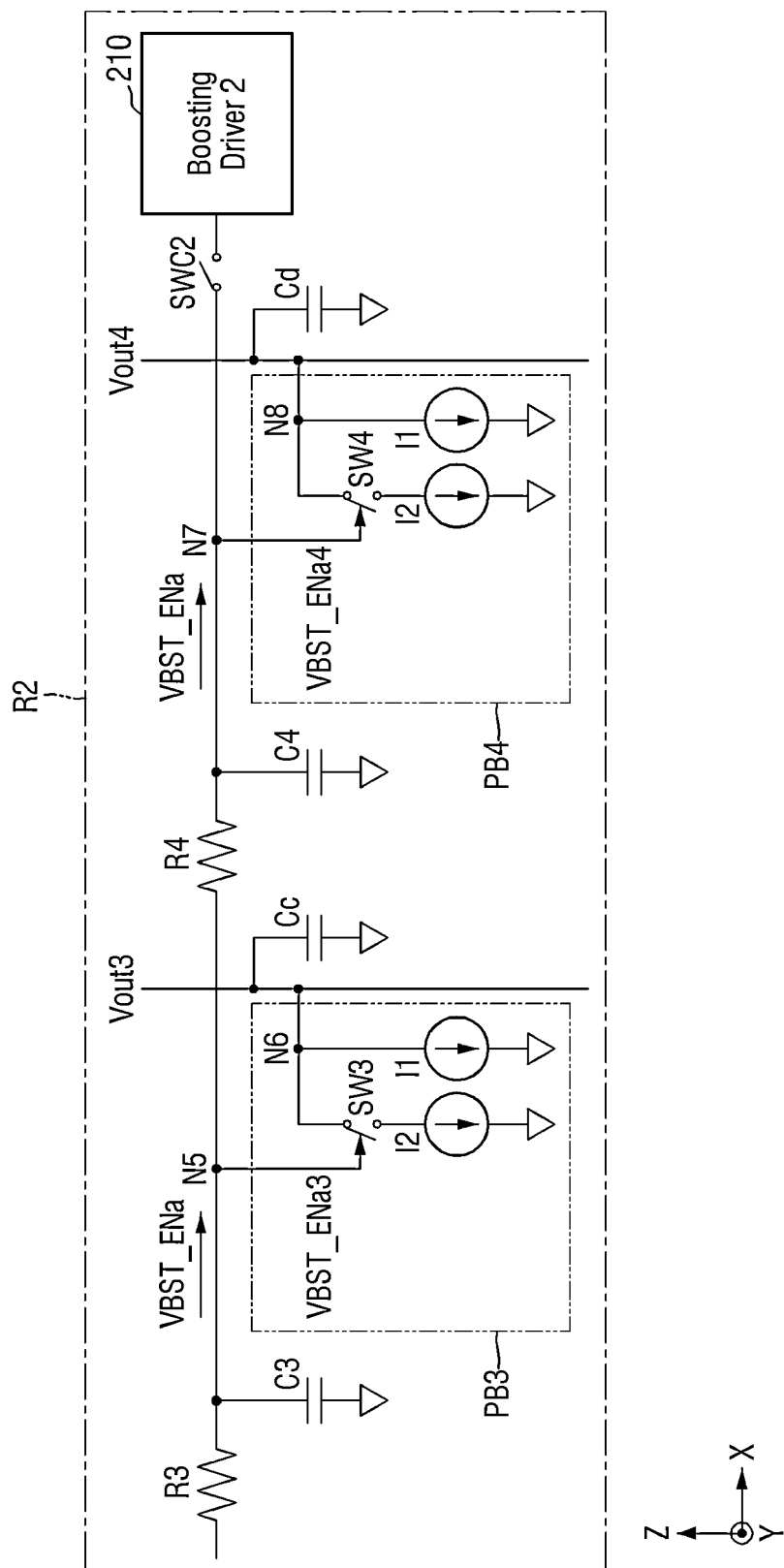
FIG. 11 is a diagram of a region R2 for explaining the image sensor according to some example embodiments.

Referring to FIG. 11, the second switch SWC2 may have an open state. That is, the second boosting driver 210 may not be connected to the row line RL. Although not shown in the drawing, the first switch SWC1 may have a closed state. That is, all the boosting circuits PB may be connected to the first boosting driver 200 through the first switch SWC1 and the row line RL. Such connection as shown in FIG. 11 may occur when the image sensor 100 is operating in the first operating mode at S313 in FIG. 10. That is, the boosting circuits PB may be operated by the boosting enable signal VBST_ENa that is output from the first boosting driver 200. At this time, the boosting enable signal VBST_ENa may be transferred only in the first direction X along the row line RL. Accordingly, the image sensor 100 may be configured to open the second switch SWC2 based on the image sensor 100 operating in the first operating mode at S312 and to close the second switch SWC2 based on the image sensor 100 operating in the second operating mode at S312. Although it is assumed that only the first boosting driver 200 is connected to the row line RL in the description, some example embodiments of the present inventive concepts are not limited thereto. For example, only the second boosting driver 210 may be connected to the row line RL. In this case, the second switch SWC2 may have a closed state, and the first switch SWC1 may have an open state.

The third boosting circuit PB3 and the fourth boosting circuit PB4 may be placed adjacent to the second boosting driver 210. However, the third boosting circuit PB3 and the fourth boosting circuit PB4 are not connected to the second boosting driver 210, but may be connected to the first boosting driver 200. A distance from the first boosting driver 200 to the third and fourth boosting circuits PB3 and PB4 may be greater than a distance from the second boosting driver 210 to the third and fourth boosting circuits PB3 and PB4.

Figure 12:
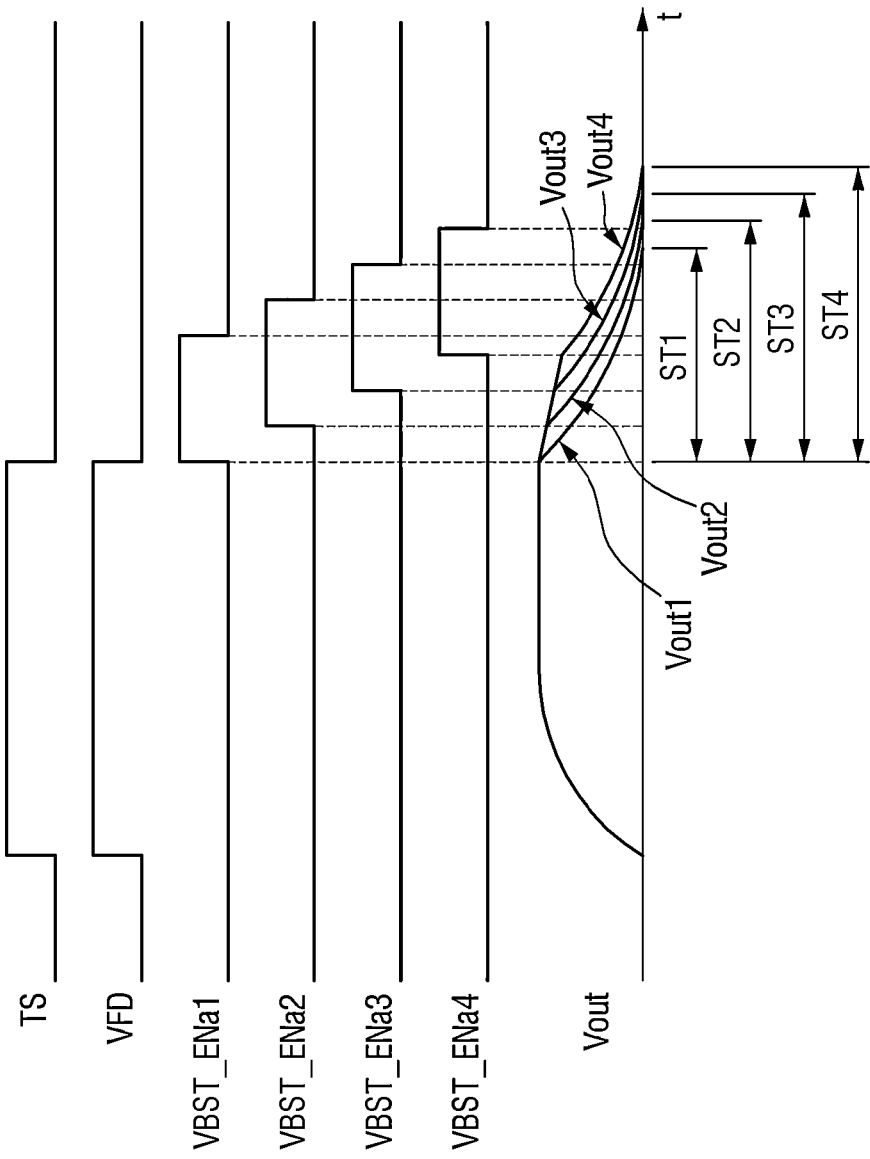
FIG. 12 is a timing diagram for explaining the operation of the image sensor according to some example embodiments.

Referring to FIGS. 11 and 12, the third boosting circuit PB3 may receive the boosting enable signal VBST_ENa. The boosting enable signal VBST_ENa may be delayed by a parasitic resistor R3 and a parasitic capacitor C3. Accordingly, the third boosting circuit PB3 may receive a third boosting enable signal VBST_ENa3. At this time, the third boosting enable signal VBST_ENa3 may be transferred after the first boosting enable signal VBST_ENa1 and the second boosting enable signal VBST_ENa2. Accordingly, the third settling time interval ST3 of voltage of the third output signal Vout3 may be greater than the first settling time interval ST1 and the second settling time interval ST2.

The fourth boosting circuit PB4 may receive the boosting enable signal VBST_ENa. The boosting enable signal VBST_ENa may be delayed by the parasitic resistor R4 and the parasitic capacitor C4. Accordingly, the fourth boosting circuit PB4 may receive the fourth boosting enable signal VBST_ENa4. At this time, the fourth boosting enable signal VBST_ENa4 may be transferred after the first boosting enable signal VBST_ENa1, the second boosting enable signal VBST_ENa2, and the third boosting enable signal VBST_ENa3. Accordingly, the fourth settling time interval ST4 of voltage of the fourth output signal Vout4 may be greater than the first settling time interval ST1, the second settling time interval ST2, and the third settling time interval ST3.

As a result, the third and fourth boosting circuits PB3 and PB4 may be configured to adjust a voltage of respective third and fourth output signals Vout3 and Vout4 based on the boosting enable signal VBST_ENa3 and VBST_ENa4 received from the first boosting driver 200 based on the image sensor 100 operating in a first operating mode (e.g., at S312 in FIG. 10), for example operating such that switch SWC1 is closed and switch SWC2 is opened. Additionally, the third and fourth boosting circuits PB3 and PB4 may be configured to adjust a voltage of respective third and fourth output signals Vout3 and Vout4 based on the boosting enable signal VBST_ENb1 and VBST_ENb2 received from the second boosting driver 210 based on the image sensor 100 operating in a second operating mode (e.g., at S313 in FIG. 10), for example operating such that switch SWC1 and SWC2 are both closed.

Still referring to FIGS. 10 and 11, because the first boosting circuit PB1 may be operated in either the first operating mode (S312) or the second operating mode (S313), the first boosting circuit PB1 may be configured to adjust a voltage of the first output signal Vout1 based on the first boosting enable signal VBST_ENa1 received from the first boosting driver 200 based on the image sensor 100 operating in either of the first operating mode or the second operating mode, for example due to the adjacency of the first boosting circuit PB1 to the first boosting driver 200 as shown in at least FIGS. 3 and 5.

Hereinafter, the operation of the image sensor 100 will be explained referring to FIG. 13.

Figure 13:
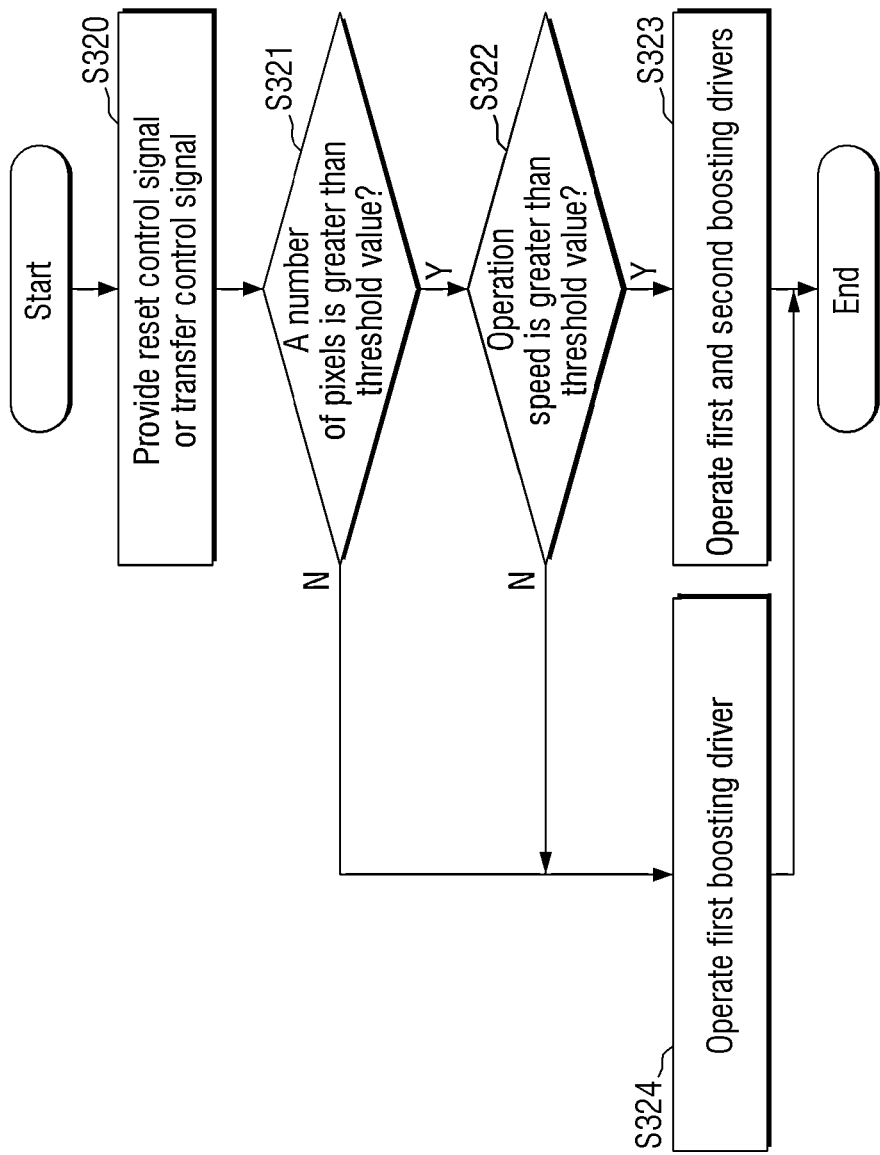
FIG. 13 is a flowchart for explaining the operation of the image sensor according to some example embodiments.

FIG. 13 is a flowchart for explaining the operation of the image sensor according to some example embodiments. For convenience of explanation, repeated parts of contents explained using FIGS. 1 to 12 will be briefly explained or omitted.

Referring to FIG. 13, the row driver 130 may provide the reset control signal RS to the reset transistor RX or may provide the transfer control signal TS to the transfer transistor TX (S320). After that, the row driver 130 may interrupt the provision of the reset control signal RS or the transfer control signal TS to the pixel PX. The voltage of the output signal Vout of the color lines COL1 to COLn may increase and become constant, while the transfer control signal TS or the reset control signal RS is being provided.

The image sensor 100 may determine whether the number of pixels PX is greater than the threshold value (S321). For example, the image sensor 100 may determine whether the pixel array 140 includes pixels PX of the threshold value or more.

If the number of pixels PX is greater than the threshold value (S321-Y), the image sensor 100 may determine whether the operating speed is greater than the threshold value (S322). For example, the image sensor 100 may determine whether the speed of the signal output from the row driver 130 is high.

If the operating speed of the image sensor 100 is greater than the threshold value (S322-Y), the image sensor 100 may operate the first boosting driver 200 and the second boosting driver 210 (S323). That is, both the first boosting driver 200 and the second boosting driver 210 may operate as explained referring to FIGS. 1 to 9. That is to say, when the number of pixels PX of the image sensor 100 is large and the operating speed is high, the image sensor 100 may boost the decrease in voltage of the output signal Vout of the column lines COL1 to COLn, using both the first boosting driver 200 and the second boosting driver 210.

If the number of pixels PX is not greater than the threshold value (S321-N), or if the operating speed of the image sensor 100 is not greater than the threshold value (S322-N), the image sensor 100 may operate the first boosting driver 200 (S324). That is, the second boosting driver 210 may not operate, and only the first boosting driver 200 may operate.

Hereinafter, the image sensor 100 will be explained referring to FIG. 14.

Figure 14:
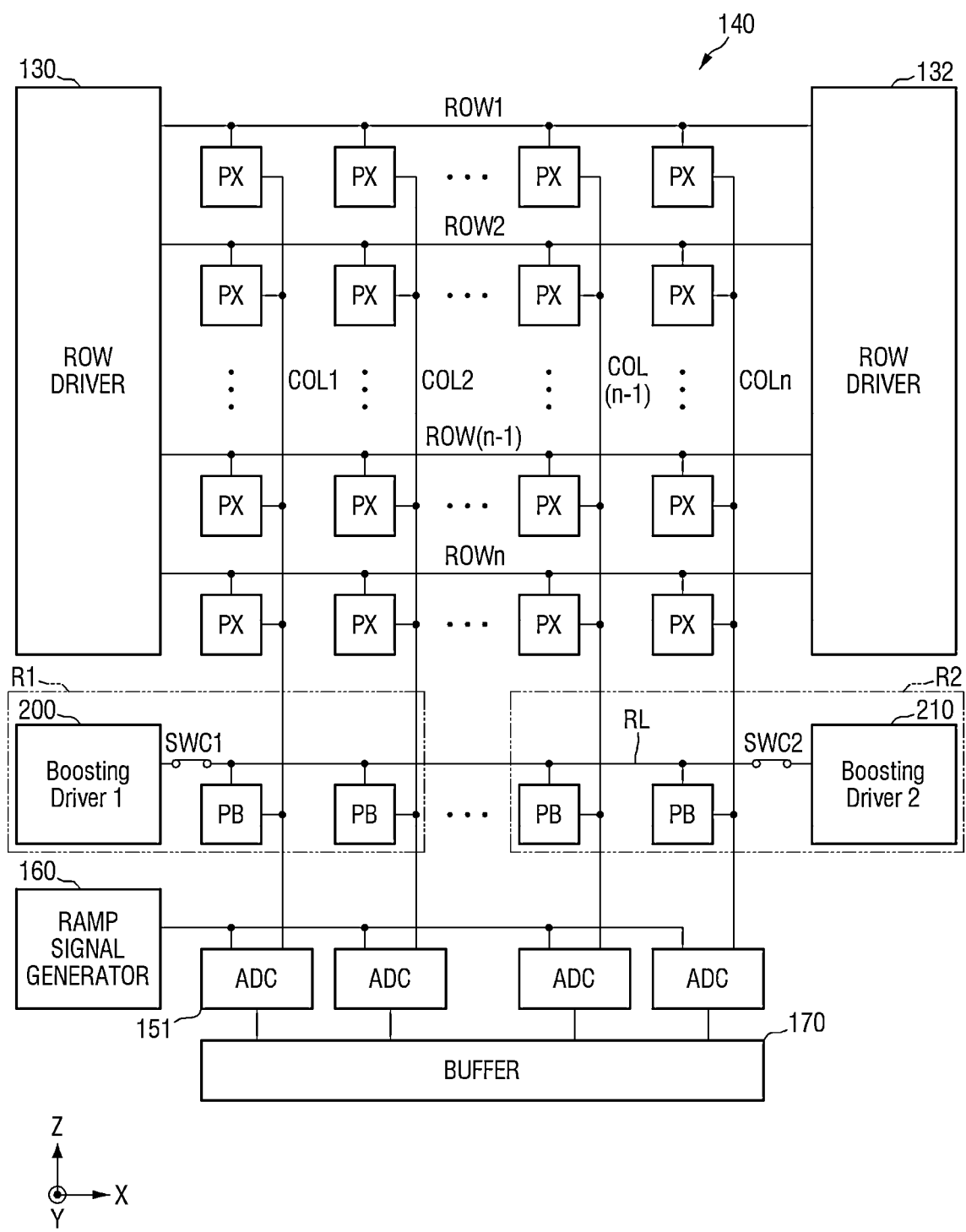
FIG. 14 is a diagram for explaining an image sensor according to some example embodiments.

FIG. 14 is a diagram for explaining an image sensor according to some example embodiments. For convenience of explanation, repeated parts of contents explained using FIGS. 1 to 13 will be briefly explained or omitted.

Referring to FIG. 14, the image sensor 100 may include a row driver 132 (also referred to herein as a second row driver). Here the row driver 132 may be different from the row driver 130 (which is also referred to herein as a first row driver). The row driver 132 may be spaced apart from (e.g., isolated from direct contact with) the pixel array 140 in the first direction X. The row driver 132 may be connected to a plurality of row lines ROW1 to ROWn. That is, one ends of the plurality of row lines ROW1 to ROWn may be connected to the row driver 130, and the other ends of the plurality of row lines ROW1 to ROWn may be connected to the row driver 132. For example, the first row line ROW1 and the pixels PX connected thereto may be between the row drivers 130 and 132. The row driver 132 may output control signals to the plurality of row lines ROW1 to ROWn, and may drive the image sensor 100. Also, the row driver 132 may be located on the same side as the second boosting driver 210.

Hereinafter, an electronic device 2000 according to some example embodiments will be explained referring to FIGS. 15 and 16.

As described herein, any image sensing devices, image sensors, and/or portions thereof according to any of the example embodiments, including the image sensing device 1, the image sensor 100, and/or any portions thereof (including, without limitation, the control register block 110, the timing generator 120, the row driver 130, the pixel array 140, the readout circuit 150, the ramp signal generator 160, the buffer 170, the image signal processor 900, etc.) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of the image sensor, including the functionality and/or methods performed by some or all of the image sensor.

Figure 15:
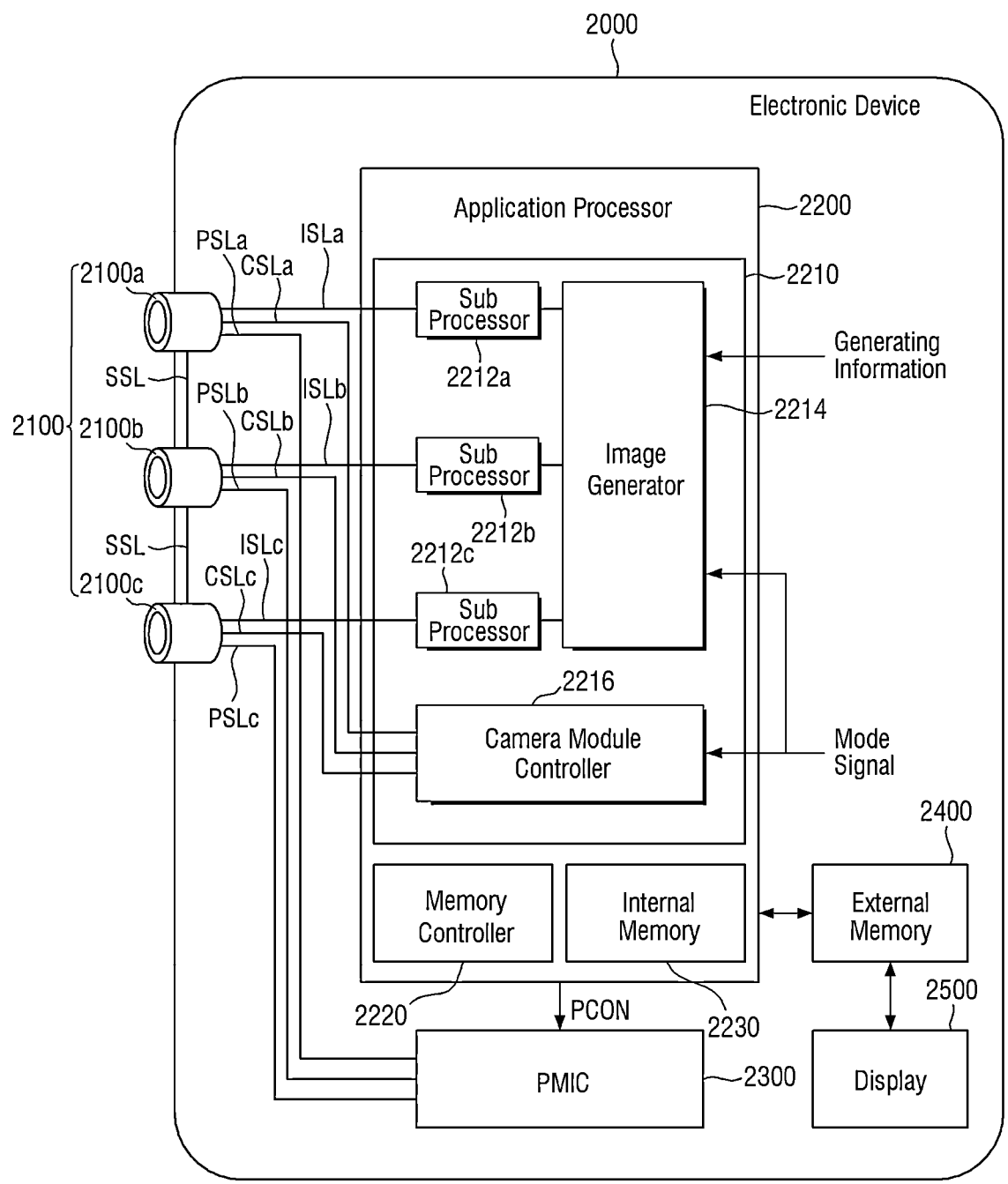
FIG. 15 is a block diagram for explaining an electronic device including a multi-camera module according to some example embodiments.

FIG. 15 is a block diagram for explaining an electronic device including a multi-camera module according to some example embodiments. FIG. 16 is a detailed block diagram of the camera module of FIG. 15. For convenience of explanation, repeated parts of contents explained using FIGS. 1 to 14 will be briefly explained or omitted.

Referring to FIG. 15, the electronic device 2000 may include a camera module group 2100, an application processor 2200, a PMIC 2300, an external memory 2400, and a display 2500.

The camera module group 2100 may include a plurality of camera modules 2100a, 2100b and 2100c, also referred to herein as simply "cameras." Even if the drawing shows some example embodiments in which three camera modules 2100a, 2100b and 2100c are placed, some example embodiments are not limited thereto. In some example embodiments, the camera module group 2100 may be modified to include only two camera modules. Also, in some example embodiments, the camera module group 2100 may be modified to include n (n is a natural number equal to or greater than 4) camera modules.

Here, one of the three camera modules 2100a, 2100b, and 2100c may include the image sensor 100 explained referring to FIGS. 1 to 14. That is, the image sensor 100 of the camera module 2100a, 2100b and 2100c may include both the first boosting driver 200 and the second boosting driver 210.

Hereinafter, although the detailed configuration of the camera module 2100b will be explained in more detail referring to FIG. 16, the following explanation may also be equally applied to other camera modules 2100a and 2100c depending on the example embodiments.

Figure 16:
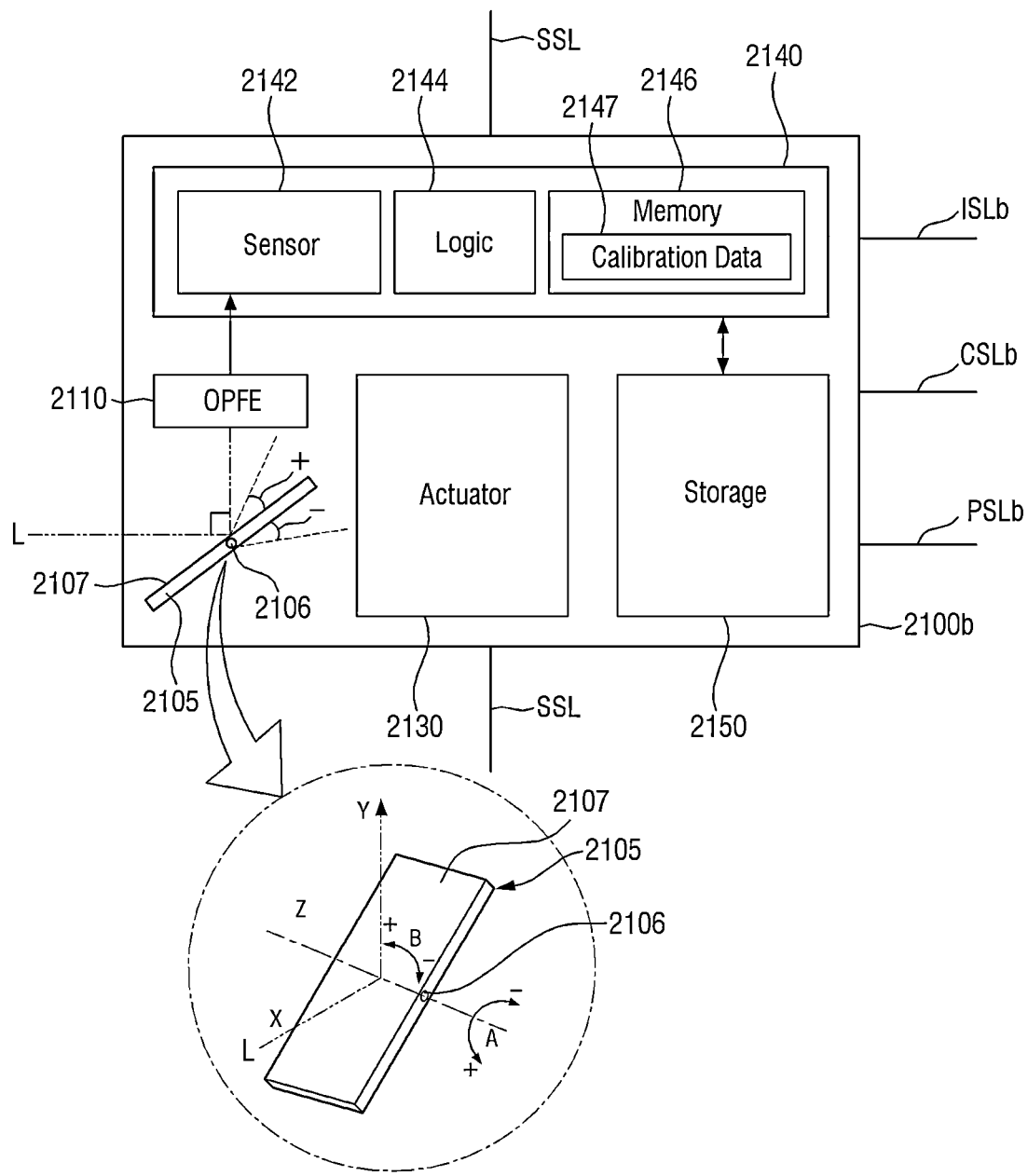
FIG. 16 is a detailed block diagram of the camera module of FIG. 15.

Referring to FIG. 16, the camera module 2100b may include a prism 2105, an optical path folding element hereinafter (hereinafter, "OPFE") 2110, an actuator 2130, an image sensing device 2140, and a storage device 2150 (e.g., a storage device or memory, such as a non-transitory computer-readable storage device.

The prism 2105 may include a reflecting surface 2107 of a light-reflecting material to modify the path of light L that is incident from the outside.

In some example embodiments, the prism 2105 may change the path of light L incident in the first direction X to a second direction Y perpendicular to the first direction X. Further, the prism 2105 may rotate the reflecting surface 2107 of the light-reflecting material in a direction A around a central axis 2106, or may rotate the central axis 2106 in a direction B to change the path of the light L incident in the first direction X into the vertical second direction Y. At this time, the OPFE 2110 may also move in the third direction Z that is perpendicular to the first direction X and the second direction Y.

In some example embodiments, as shown, although a maximum rotation angle of the prism 2105 in the direction A is equal to or less than 15 degrees in a positive (+) direction A, and may be greater than 15 degrees in a negative (−) direction A, some example embodiments are not limited thereto.

In some example embodiments, the prism 2105 may move about 20 degrees, or between 10 and 20 degrees, or between 15 and 20 degrees in the positive (+) or negative (−) direction B. Here, the moving angle may move at the same angle in the positive (+) or negative (−) direction B, or may move to almost the same angle within the range of about 1 degree.

In some example embodiments, the prism 2105 may move the reflecting surface 2107 of the light-reflecting material in the third direction (e.g., a direction Z) parallel to the extension direction of the central axis 2106.

The OPFE 2110 may include, for example, an optical lens including m (here, m is a natural number) groups. The m lenses may move in the second direction Y to change an optical zoom ratio of the camera module 2100b. For example, when a basic optical zoom ratio of the camera module 2100b is set as Z, if the m optical lenses included in the OPFE 2110 are moved, the optical zoom ratio of the camera module 2100b may be changed to the optical zoom ratio of 3Z or 5Z or higher.

The actuator 2130 may move the OPFE 2110 or an optical lens (hereinafter, referred to as an optical lens) to a specific position. For example, the actuator 2130 may adjust the position of the optical lens so that the image sensor 2142 is located at a focal length of the optical lens for accurate sensing.

The image sensing device 2140 may include an image sensor 2142, control logic 2144 and a memory 2146. The image sensor 2142 may sense the image to be sensed, using light L provided through the optical lens. In some example embodiments, the image sensor 2142 may include the image sensor 100 described above.

The control logic 2144 may control the overall operation of the camera module 2100b. For example, the control logic

2144 may control the operation of the camera module 2100b according to the control signal provided through the control signal line CSLb.

The memory 2146 may store information necessary for the operation of the camera module 2100b such as calibration data 2147. The calibration data 2147 may include information necessary for the camera module 2100b to generate image data, using the light L provided from the outside. The calibration data 2147 may include, for example, information on the degree of rotation, information on the focal length, information on the optical axis explained above, and the like. If the camera module 2100b is implemented in the form of a multi-state camera whose focal length changes depending on the position of the optical lens, the calibration data 2147 may include information about the focal length values and auto focusing for each position (or for each state) of the optical lens.

The storage device 2150 may store the image data sensed through the image sensor 2142. The storage device 2150 may be placed outside the image sensing device 2140, and may be implemented in the form of being stacked with a sensor chips constituting the image sensing device 2140. In some example embodiments, although the storage device 2150 may be implemented as an EEPROM (Electrically Erasable Programmable Read-Only Memory), some example embodiments are not limited thereto.

Referring to FIGS. 15 and 16 together, in some example embodiments, each of the plurality of camera modules 2100a, 2100b, and 2100c may include an actuator 2130. Accordingly, each of the plurality of camera modules 2100a, 2100b, and 2100c may include calibration data 2147 that is the same as or different from each other depending on the operation of the actuator 2130 included therein.

In some example embodiments, one camera module (e.g., 2100b) among the plurality of camera modules 2100a, 2100b, and 2100c is a folded lens (e.g., 2100b) type camera module including the prism 2105 and the OPFE 2110 described above, and the remaining camera modules (e.g., 2100a and 2100c) may be vertical camera modules which do not include the prism 2105 and the OPFE 2110. However, some example embodiments are not limited thereto.

In some example embodiments, one camera module (e.g., 2100c) among the plurality of camera modules 2100a, 2100b, and 2100c may be a vertical depth camera which extracts depth information, for example, using an IR (Infrared Ray). In this case, the application processor 2200 may merge the image data provided from such a depth camera with the image data provided from another camera module (e.g., 2100a or 2100b) to generate a three-dimensional (3D) depth image.

In some example embodiments, at least two camera modules (e.g., 2100a and 2100c) among the plurality of camera modules 2100a, 2100b, and 2100c may have fields of view different from each other. In this case, for example, although the optical lenses of at least two camera modules (e.g., 2100a and 2100c) among the plurality of camera modules 2100a, 2100b, and 2100c may be different from each other, some example embodiments are not limited thereto.

Also, in some example embodiments, viewing angles of each of the plurality of camera modules 2100a, 2100b, and 2100c may be different from each other. In this case, although the optical lenses included in each of the plurality of camera modules 2100a, 2100b, and 2100c may also be different from each other, some example embodiments are not limited thereto.

In some example embodiments, each of the plurality of camera modules 2100a, 2100b, and 2100c may be placed physically separated from each other. That is, the sensing region of one image sensor 2142 is not used separately by a plurality of camera modules 2100a, 2100b, and 2100c, but an independent image sensor 2142 may be placed inside each of the plurality of camera modules 2100a, 2100b, and 2100c.

Referring to FIG. 15 again, the application processor 2200 may include an image processing device 2210, a memory controller 2220, and an internal memory 2230. The application processor 2200 may be implemented separately from the plurality of camera modules 2100a, 2100b, and 2100c. For example, the application processor 2200 and the plurality of camera modules 2100a, 2100b, and 2100c may be implemented separately as separate semiconductor chips.

The image processing device 2210 may include a plurality of sub-image processors 2212a, 2212b, and 2212c, an image generator 2214, and a camera module controller 2216.

The image processing device 2210 may include a plurality of sub-image processors 2212a, 2212b, 2212c corresponding to the number of the plurality of camera modules 2100a, 2100b, and 2100c.

Image data generated from each of the camera modules 2100a, 2100b, and 2100c may be provided to the corresponding sub-image processors 2212a, 2212b, and 2212c through image signal lines ISLa, ISLb, and ISLc separated from each other. For example, the image data generated from the camera module 2100a is provided to the sub-image processor 2212a through the image signal line ISLa, the image data generated from the camera module 2100b is provided to the sub-image processor 2212b through the image signal line ISLb, and the image data generated from the camera module 2100c may be provided to the sub-image processor 2212c through the image signal line ISLc. Although such an image data transmission may be performed using, for example, a camera serial interface (CSI) based on a mobile industry processor interface (MIPI), some example embodiments are not limited thereto.

On the other hand, in some example embodiments, one sub-image processor may be placed to correspond to a plurality of camera modules. For example, the sub-image processor 2212a and the sub-image processor 2212c are not implemented separately from each other as shown, but are integrated and implemented as a single sub-image processor. The image data provided from the camera module 2100a and the camera module 2100c may be selected through a selection element (e.g., a multiplexer) or the like and then provided to an integrated sub-image processor.

The image data provided to the respective sub-image processors 2212a, 2212b, and 2212c may be provided to the image generator 2214. The image generator 2214 may generate the output image, using the image data provided from the respective sub-image processors 2212a, 2212b, and 2212c according to the image generating information or the mode signal.

Specifically, the image generator 2214 merges at least a part of the image data generated from the camera modules 2100a, 2100b, and 2100c having different viewing angles to generate the output image, according to the image generating information or the mode signals. Further, the image generator 2214 may select any one of the image data generated from the camera modules 2100a, 2100b, and 2100c having different viewing angles and output the output image, according to the image generating information or the mode signal.

In some example embodiments, the image generating information may include a zoom signal (or a zoom factor). Also, in some example embodiments, the mode signal may be, for example, a signal based on the mode selected from a user.

When the image generating information is a zoom signal (a zoom factor) and each of the camera modules 2100a, 2100b, and 2100c has different fields of view (viewing angles), the image generator 2214 may perform different operations depending on the type of zoom signal. For example, when the zoom signal is a first signal, the image data output from the camera module 2100a and the image data output from the camera module 2100c are merged, and then an output image may be generated, using the merged image signal, and the image data which is not used for merging and output from the camera module 2100b. If the zoom signal is a second signal that is different from the first signal, the image generator 2214 does not merge the image data, and may select one of the image data output from each of the camera modules 2100a, 2100b, and 2100c and generate the output image. However, some example embodiments are not limited thereto, and the method of processing the image data may be modified as much as necessary.

In some example embodiments, the image generator 2214 may receive a plurality of image data with different exposure times from at least one of the plurality of sub-image processors 2212a, 2212b, and 2212c, and perform high dynamic range (HDR) processing on the plurality of image data to generate merged image data with an increased dynamic range.

The camera module controller 2216 may provide the control signal to each of the camera modules 2100a, 2100b, and 2100c. The control signals generated from the camera module controller 2216 may be provided to the corresponding camera modules 2100a, 2100b, and 2100c through the control signal lines CSLa, CSLb and CSLc separated from each other.

One of the plurality of camera modules 2100a, 2100b, and 2100c is designated as a master camera (e.g., 2100a) depending on the image generating information including the zoom signal or the mode signal, and the remaining camera modules (e.g., 2100b and 2100c) may be designated as a slave camera. This information is included in the control signal, and may be provided to the corresponding camera modules 2100a, 2100b, and 2100c through the control signal lines CSLa, CSLb and CSLc separated from each other.

Depending on the zoom factor or the operation mode signal, the camera modules that operate as master and slave may be modified. For example, if the viewing angle of the camera module 2100a is wider than that of the camera module 2100c and the zoom factor exhibits a low zoom ratio, the camera module 2100c operates as the master, and the camera module 2100a may operate as the slave. In contrast, when the zoom factor exhibits a high zoom ratio, the camera module 2100a may operate as the master and the camera module 2100c may operate as the slave.

In some example embodiments, the control signal provided from the camera module controller 2216 to the respective camera modules 2100a, 2100b, and 2100c may include a sync enable signal. For example, if the camera module 2100b is the master camera and the camera modules 2100a and 2100c are slave cameras, the camera module controller 2216 may transmit sync enable signal to the camera module 2100b. The camera module 2100b, which receives the sync enable signal, generates a sync signal on the basis of the received sync enable signal, and may provide the generated sync signal to the camera modules 2100a and 2100c through the sync signal line SSL. The camera modules 2100b and the camera modules 2100a and 2100c may transfer the image data to the application processor 2200 in synchronization with such a sync signal.

In some example embodiments, the control signal provided from the camera module controller 2216 to the plurality of camera modules 2100a, 2100b, and 2100c may include mode information according to the mode signal. On the basis of the mode information, the plurality of camera modules 2100a, 2100b, and 2100c may operate in the first and second operating modes in connection with the sensing speed.

The plurality of camera modules 2100a, 2100b, and 2100c may generate an image signal at the first speed (for example, generate an image signal of a first frame rate) in the first operation mode, encode the image signal at a second speed higher than the first speed (for example, encode an image signal of a second frame rate higher than the first frame rate), and transmit the encoded image signal to the application processor 2200. At this time, the second speed may be 30 times or less of the first speed.

The application processor 2200 may store the received image signal, that is to say, the encoded image signal, in the internal memory 2230 or an external memory 2400 of the application processor 2200, and then read and decode the encoded image signal from the internal memory 2230 or the external memory 2400, and display image data generated on the basis of the decoded image signal. For example, the corresponding sub-image processors among the plurality of sub-image processors 2212a, 2212b, and 2212c of the image processing device 2210 may perform decoding, and may also perform image processing on the decoded image signal. For example, the image data generated on the basis of the decoded image signal may be displayed on the display 2500.

A plurality of camera modules 2100a, 2100b, and 2100c may generate image signals at a third speed lower than the first speed in the second operating mode (for example, generate an image signal of a third frame rate lower than the first frame rate), and transmit the image signal to the application processor 2200. The image signal provided to the application processor 2200 may be a non-encoded signal. The application processor 2200 may perform image processing on the received image signal or store the image signal in the internal memory 2230 or the external memory 2400.

The PMIC 2300 may supply the power, e.g., the power supply voltage, to each of the plurality of camera modules 2100a, 2100b, and 2100c. For example, the PMIC 2300 may supply the first power to the camera module 2100a through a power signal line PSLa, supply the second power to the camera module 2100b through a power signal line PSLb, and supply the third power to the camera module 2100c through a power signal line PSLc, under the control of the application processor 2200.

The PMIC 2300 may generate power corresponding to each of the plurality of camera modules 2100a, 2100b, and 2100c and adjust the level of power, in response to a power control signal PCON from the application processor 2200. The power control signal PCON may include power adjustment signals for each operating mode of the plurality of camera modules 2100a, 2100b, and 2100c. For example, the operating mode may include a low power mode, and at this time, the power control signal PCON may include information about the camera module operating in the low power mode and the set power level. The levels of powers provided to each of the plurality of camera modules 2100a, 2100b, and 2100c may be the same as or different from each other. Also, the levels of powers may be changed dynamically.

As described herein, any of the electronic devices, including the electronic device 2000, and/or any portions thereof (including, without limitation, the application processor 2200, the image processing device 2210, the memory controller 2220, the internal memory 2230, any of the sub-image processors 2212a to 2212c, image generator 2214, camera module controller 2216, the PMIC 2300, the external memory 2400, and/or any of the camera modules 2100a-2100c of the camera module group 2100, including image sensing device 2140, image sensor 2142, control logic 2144, memory 2146, storage device 2150, OPFE 2110, etc.) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., internal memory 2230, external memory 2400, memory 2146, and/or storage device 2150), for example a solid state drive (SSD), storing a program of instructions, and a processor (e.g., image processing device 2210 or any portion thereof, memory controller 2220, camera module controller 2216, etc.) configured to execute the program of instructions to implement the functionality and/or methods performed by some or all of the electronic device, including the functionality and/or methods performed by some or all of the image processing device 2210, the image generator 2214, the camera module controller 2216, any of the sub-image processors 2212a to 2212c, the memory controller 2220, the internal memory 2230, the PMIC 2300, the external memory 2400, the application processor 2200, the image sensing device 2140, any combination thereof, or the like.

Any of the memories described herein, including, without limitation, internal memory 2230, external memory 2400, memory 2146, and/or storage device 2150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

In concluding the detailed description, those skilled in the art will appreciate that many variations and modifications may be made to the described example embodiments described without substantially departing from the principles of the present inventive concepts. Therefore, the described example embodiments of the inventive concepts are used in a generic and descriptive sense only and not for purposes of limitation.

What is claimed is:
1. An image sensor, comprising:
a first row driver;
a first row line which is connected to the first row driver and extends;
a first pixel and a second pixel which are connected to the first row line;
a first column line which is connected to the first pixel and is configured to receive a first output signal from the first pixel;
a second column line which is connected to the second pixel and is configured to receive a second output signal from the second pixel;
a first boosting driver;
a second boosting driver;
a first boosting circuit connected to the first column line and configured to generate a first boosted output signal based on the first output signal and a first boosting enable signal received from the first boosting driver;
a second boosting circuit connected to the second column line and configured to generate a second boosted output signal based on the second output signal and a second boosting enable signal received from the second boosting driver;
a second row line which is connected to the first and second boosting circuits;
a first analog-digital converter (ADC) configured to receive the first boosted output signal; and
a second ADC configured to receive the second boosted output signal,
wherein the first boosting circuit is configured to adjust voltages of the first output signal,
wherein the second boosting circuit is configured to adjust voltages of the second output signal, and
wherein the first boosting driver is connected to a first terminal of the second row line and the second boosting driver is connected to a second terminal of the second row line.

2. The image sensor of claim 1, wherein the first output signal has a first voltage level and the first boosted output signal has a second voltage level lower than the first voltage level.

3. The image sensor of claim 2, further comprising a ramp signal generator connected to the first and second ADCs.

4. The image sensor of claim 1, wherein:
the first boosting circuit includes a first current source connected to the first column line, a first switch connected to the first column line, and a second current source connected to the first switch, and
the first switch is configured to operate in response to the first boosting enable signal transferred through the second row line.

5. The image sensor of claim 1, wherein the first boosting circuit includes:
a first sub-boosting circuit including a first current source connected between the first column line and the second row line, and
the second boosting circuit includes a second sub-boosting circuit including a second current source connected between the second column line and the second row line.

6. The image sensor of claim 5, wherein
the image sensor is configured to cause the first and second boosting enable signals to be applied to the first and second sub-boosting circuits, respectively, at a same first time.

7. The image sensor of claim 5, further comprising:
a third pixel connected to the first row line and a third column line and configured to generate a third output signal;

a fourth pixel connected to the first row line and a fourth column line and configured to generate a fourth output signal;
a third boosting circuit connected to the third column line and configured to generate a third boosted output signal based on the third output signal and a third boosting enable signal received from the first boosting driver; and
a fourth boosting circuit connected to the fourth column line and configured to generate a fourth boosted output signal based on the fourth output signal and a fourth boosting enable signal received from the second boosting driver.

8. The image sensor of claim 1, wherein
the first pixel includes
a photoelectric conversion element which is configured to receive incident light, and
a transfer transistor which connects the photoelectric conversion element and the first column line,
the transfer transistor is configured to operate in response to a transfer control signal received from the first row driver, and
the first boosting driver is configured to output the first boosting enable signal after the transfer control signal is applied.

9. The image sensor of claim 8, wherein
the first pixel includes a reset transistor which connects a voltage source and the first column line,
the reset transistor is configured to operate in response to a reset control signal received from the first row driver, and
the first boosting driver is configured to output the first boosting enable signal after the reset control signal is applied.

10. The image sensor of claim 1, further comprising:
a second row driver connected to the first row line,
wherein the first row line and the first to second pixels are between the first and second row drivers.

11. An image sensor, comprising:
a first pixel connected to a first column line and configured to generate a first output signal;
a second pixel connected to the first column line and configured to generate a second output signal;
a third pixel connected to a second column line and configured to generate a third output signal;
a fourth pixel connected to the second column line and configured to generate a fourth output signal;
a first boosting driver;
a second boosting driver;
a first boosting circuit configured to
generate a first boosted output signal based on the first output signal and a first boosting enable signal received from the first boosting driver, and
generate a second boosted output signal based on the second output signal and the first boosting enable signal received from the first boosting driver;
a second boosting circuit configured to
generate a third boosted output signal based on the third output signal and a second boosting enable signal received from the second boosting driver, and
generate a fourth boosted output signal based on the fourth output signal and the second boosting enable signal received from the second boosting driver;
a first analog-digital converter (ADC) configured to receive the first and second boosted output signals; and
a second ADC configured to receive the third and fourth boosted output signals.

12. The image sensor of claim 11, wherein the first output signal has a first voltage level and the first boosted output signal has a second voltage level lower than the first voltage level.

13. The image sensor of claim 12, further comprising a ramp signal generator connected to the first and second ADCs.

14. The image sensor of claim 11, wherein:
the first boosting circuit includes a first current source connected to the first column line, a first switch connected to the first column line, and a second current source connected to the first switch, and
the first switch is configured to operate in response to the first boosting enable signal transferred through a row line connecting the first and second boosting circuits.

15. The image sensor of claim 11, wherein
the first boosting circuit includes a first sub-boosting circuit connected between the first column line and a row line, and
the second boosting circuit includes a second sub-boosting circuit connected between the second column line and the row line.

16. The image sensor of claim 15, wherein the image sensor is configured to cause the first and second boosting enable signals to be applied to the first and second sub-boosting circuits, respectively, at a same first time.

* * * * *